(12) United States Patent
Teraoka et al.

(10) Patent No.: US 8,309,877 B2
(45) Date of Patent: Nov. 13, 2012

(54) HEAT TRANSFERRING MEMBER FOR SOLDER HANDLING DEVICE, AND ELECTRIC SOLDERING IRON AND ELECTRIC DESOLDERING TOOL WITH THE HEAT TRANSFERRING MEMBER

(75) Inventors: Yoshitomo Teraoka, Sennan (JP); Takashi Nagase, Kashiba (JP)

(73) Assignee: Hakko Corporation, Osaka (JP)

( * ) Notice: Subject to any disclaimer, the term of this patent is extended or adjusted under 35 U.S.C. 154(b) by 519 days.

(21) Appl. No.: 12/609,787

(22) Filed: Oct. 30, 2009

(65) Prior Publication Data

US 2010/0108647 A1 May 6, 2010

Related U.S. Application Data

(60) Provisional application No. 61/109,845, filed on Oct. 30, 2008.

(51) Int. Cl.
*B23K 1/002* (2006.01)
(52) U.S. Cl. ........................ 219/85.2; 219/229
(58) Field of Classification Search ................ 219/85.1, 219/85.13, 85.16, 85.21, 129
See application file for complete search history.

(56) References Cited

U.S. PATENT DOCUMENTS

| | | | |
|---|---|---|---|
| 2,790,060 | A | 4/1957 | Pricer |
| 3,096,160 | A | 7/1963 | Puyear |
| 3,121,781 | A | 2/1964 | Schoenwald |
| 4,517,229 | A | 5/1985 | Nockola et al. |
| 5,804,795 | A * | 9/1998 | Fortune ..................... 219/229 |
| 6,335,514 | B2 * | 1/2002 | McAmmond et al. ...... 219/85.16 |
| 6,818,862 | B2 | 11/2004 | Uetani et al. |
| 7,030,339 | B2 | 4/2006 | Nagase et al. |

FOREIGN PATENT DOCUMENTS

WO    WO 02/10477    2/2002

* cited by examiner

*Primary Examiner* — Chandra Chaudhari
(74) *Attorney, Agent, or Firm* — Squire Sanders (US) LLP

(57) ABSTRACT

A heat transferring member comprises a heat transfer body for melting solder, and a pipe inserted into a hole formed in the heat transfer body, wherein heat from a heating member is conducted to the heat transfer body. The pipe includes a tubular-shaped substrate made of copper or copper alloy, and an aluminum oxide film formed at least on a peripheral surface of the tubular-shaped substrate. The pipe may be press-fitted in the hole.

26 Claims, 15 Drawing Sheets

HEAT TRANSFERRING MEMBER FOR SOLDER HANDLING DEVICE, AND ELECTRIC SOLDERING IRON AND ELECTRIC DESOLDERING TOOL WITH THE HEAT TRANSFERRING MEMBER

CROSS-REFERENCE TO RELATED APPLICATION

This application claims the benefit of U.S. Provisional Application No. 61/109,845, filed Oct. 30, 2008, which is incorporated herein by reference in its entirety.

BACKGROUND OF THE INVENTION

1. Field of the Invention

This invention relates generally to a heat transferring member for a solder handling device for use in soldering, and more particularly to an electric soldering iron, and an electric desoldering tool with the heat transferring member.

2. Description of the State of the Art

Heretofore, in electric and electronic industries, a soldering method has been generally employed as a means for connecting and joining electronic components.

Various soldering methods are available, such as: a flow soldering method using a solder bath for immersing a printed-wiring board with electronic components into molten solder, or immersing a solder joining area directly into a jet flow of molten solder; a reflow soldering method of pre-applying solder paste in a given pattern onto a printed-wiring board by screen printing, placing surface-mount components on the printed-wiring board, and then passing the printed-wiring board through a high-temperature reflow furnace to melt the solder pattern to form a solder joint; and an iron soldering method including both a manual soldering operation using a tool such as an electric soldering iron, and a machine soldering method using a dedicated automatic machine with a soldering iron unit.

Soldering of electronic components onto wiring boards has been dominated by operations based on a flow soldering method or a reflow soldering method free of the need for human power or suitable for mass production. However, soldering for a particular component and repair operations often requires a manual tool, such as an electric soldering iron, to be handled by a skilled operator or a dedicated automated machine. In such a case, a soldering operation using the iron soldering method is essential.

As a conventional heat transferring member employed in soldering for the iron soldering method, there has been known one type which comprises a heat transfer body for melting solder, and an insert pipe made of stainless steel and inserted into a dead-ended hole formed in the heat transfer body, so that the heat from a heating member is conducted from the heat transfer body to solder via the insert pipe.

However, stainless steel has thermal conductivity less than copper. Therefore, considering heat transfer from the heating member to a surface of the heat transfer body, the insert pipe interposed therebetween causes deterioration in efficiency of the heat transfer from the heating member to the heat transfer body.

In this connection, U.S. Pat. No. 6,818,862 (entitled "Iron tip and electric soldering iron") and International Patent Publication No. WO/2002/010477 A1 (entitled "Electric soldering iron tip and electric soldering iron") disclose a technique for subjecting an inner surface of the hole of the heat transfer body directly to a surface modification treatment to prevent oxidation of the inner surface of the hole of the heat transfer body, instead of interposing the insert pipe between the heating member and the heat transfer body. However, the hole in the heat transfer body to receive therein the heating member is formed to define a dead-ended hole (also referred to as a non-through-hole or a blind hole) having a relatively large depth from a base end of the heat transfer body. Therefore, a flow of gas required for the surface modification treatment stagnates inside the hole to preclude a possibility to obtain a homogeneous surface-modified layer.

In view of the above conventional problems, there is a need for improved suppression of oxidation of a heat transfer body of a heat transferring member for a solder handling device, while maintaining high heat transfer efficiency.

SUMMARY OF THE INVENTION

Briefly and in general terms, the present invention is directed to a heat transferring member for a solder handling device, a solder handling device, and a method of making a heat transferring member for a solder handling device.

In some aspects of the present invention, a heat transferring member comprises a heat transfer body having a cavity formed therein. The heat transferring member further comprises a pipe disposed in the cavity, the pipe including a tubular-shaped substrate of copper or copper alloy, the pipe further including an aluminum oxide film over the substrate.

In some aspects of the present invention, a solder handling device comprises a heat transfer body including a sleeve portion and a tip portion configured to melt solder, the tip portion including a tapered point or a hollow nozzle. The solder handling device further includes a pipe disposed in the sleeve portion, the pipe including a tubular-shaped substrate of copper or copper alloy, the pipe further including an aluminum oxide film over the substrate. The solder handling device further comprises an electric heater disposed in the pipe.

In some aspects of the invention, a method of making a heat transferring member comprises providing a heat transfer body including a sleeve portion, and inserting a pipe in the sleeve. The pipe including a substrate and an aluminum oxide film over the substrate, the substrate made of copper or copper alloy.

The features and advantages of the invention will be more readily understood from the following detailed description which should be read in conjunction with the accompanying drawings.

BRIEF DESCRIPTION OF THE DRAWINGS

FIGS. 5A and 5B are diagrams for explaining a configuration of a proximal end of the pipe in the first embodiment, wherein FIG. 5A is a side view of the proximal end of the pipe, and FIG. 5B is a front view of the proximal end of the pipe;

FIGS. 10A and 10B are diagrams for explaining a configuration of a proximal end of a pipe of a heat transferring member for an electric soldering iron according to a third embodiment of the present invention, wherein the proximal end is fabricated in a generally square shape in transverse cross-section, and wherein FIG. 10A is a side view of the proximal end of the pipe, and FIG. 10B is a front view of the proximal end of the pipe;

FIGS. 11A and 11B are diagrams for explaining a configuration of a proximal end of a pipe of a heat transferring member for an electric soldering iron according to a fourth embodiment of the present invention, wherein the proximal end is fabricated in a flared shape to have a diameter which increases toward a proximal end of the pipe, and wherein FIG. 11A is a side view of the proximal end of the pipe, and FIG. 11B is a front view of the proximal end of the pipe;

DETAILED DESCRIPTION OF THE INVENTION

Figure 1:
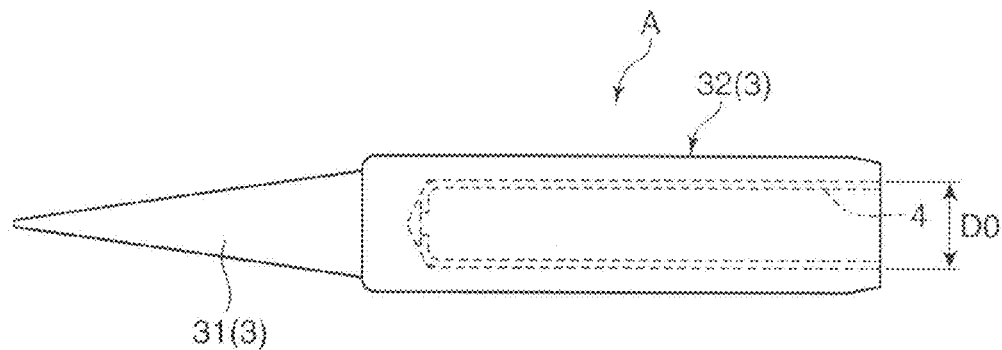
FIG. 1 is a side view of a heat transferring member for an electric soldering iron according to a first embodiment of the present invention.

According some embodiments of the present invention, there is provided a heat transferring member for a solder handling device, which comprises a heat transfer body of which a basic portion is made of copper or copper alloy, and a pipe covering an inner surface of a dead-ended hole formed in the heat transfer body to receive therein a heating member. The heat transferring member is characterized in that the pipe includes a tubular-shaped substrate made of copper or copper alloy, and an aluminum oxide film formed at least on a peripheral surface of the tubular-shaped substrate.

In the heat transferring member of the present invention, the copper or copper alloy pipe having the aluminum oxide film formed on inner and outer peripheral surfaces thereof can be press-fitted into the hole of the heat transfer body. Therefore, the extremely stable aluminum oxide films on the inner and outer peripheral surfaces of the pipe is interposed between the heating member and the heat transfer body. Consequently, the aluminum oxide film can prevent oxidization of an inner surface of the hole of the heat transfer body, even if the heat transfer body is used in a high-temperature state due to the heat received from the heating member. In addition, the pipe is made of copper or copper alloy having a high thermal conductivity, so that the heat from the heating member is efficiently conducted via the pipe in cooperation with the aluminum oxide film having the relatively high heat transfer efficiency. This makes it possible to achieve the suppression of oxidation in the heat transfer body while maintaining heat transfer efficiency. As used herein, the term "heat transfer body" is a generic term which means a iron tip of a soldering iron, a sleeve body of an electric solder-sucking device (electric desoldering tool), or the like.

Furthermore, the iron tip of the soldering iron is not limited to a type where a pointed head portion and a sleeve body are integrated together as a single piece, but may be a type where each of the pointed head portion and the sleeve body is formed as an independent or separate member.

Preferably, the aluminum oxide film includes an aluminum oxide passivation film formed through a reaction of oxygen in atmospheric air to a copper-aluminum (Cu—Al) alloy layer which is formed on a surface of a copper or copper alloy layer of the tubular-shaped substrate by subjecting the surface of the tubular-shaped substrate to an aluminizing treatment.

In this mode, the copper or copper alloy substrate to be modified by the aluminizing treatment is in the tubular-shape. Therefore, a gas flow would never stagnate inside the tubular-shaped substrate during the aluminizing treatment, so that the alloy layer can be more homogenously formed. This results in the aluminum oxide passivation film to be more homogenously formed, as compared with a technique of subjecting the inner surface of the dead-ended hole of the heat transfer body to an aluminizing treatment. In addition, the aluminum oxide film includes the naturally-formed aluminum oxide passivation film, so that an aluminum oxide passivation film would be immediately re-formed, even if the Cu—Al alloy layer would be exposed to atmospheric air due to the occurrence of damage in the aluminum oxide film on the surface of the tubular-shaped substrate.

This makes it possible to maintain oxidation resistance over a long duration.

Preferably, the aluminizing treatment for the surface of the tubular-shaped substrate is an aluminum diffusion modification based on a pack cementation process.

Based on a vapor-phase diffusion effect in this mode, the inner surface of the tubular-shaped substrate having a through-hole can be adequately subjected to the diffusion modification.

The aluminizing treatment for the surface of the tubular-shaped substrate may include processes of applying a mixture of an aluminum powder and a flux at least onto the peripheral surface of the tubular-shaped substrate, and then subjecting the resulting tubular-shaped substrate to a heating treatment to modify the surface of the tubular-shaped substrate.

In this mode, the aluminizing treatment can be performed using a relatively small-scale facility, as compared with a pack cementation process.

Preferably, the tubular-shaped substrate has an annular-shaped inwardly-extending flange formed at a distal end thereof and faces a dead-end of the hole.

Despite of the tubular shape, the pipe in this mode can partially cover an end surface of the hole of the heat transfer body to suppress oxidation of the end surface of the hole of the heat transfer body, while covering the inner surface of the hole of the heat transfer body.

Preferably, the tubular-shaped substrate has a proximal end formed in a polygonal shape in transverse cross-section, and wherein a diameter of a circumscribed circle about the proximal end is greater than an outer diameter of an intermediate portion of the tubular-shaped substrate.

In this mode, the proximal end of the tubular-shaped substrate is formed in a generally polygonal shape in such a manner that the diameter of the circumscribed circle is greater than the outer diameter of the intermediate portion. Therefore, when the pipe is press-fitted into the hole formed in the heat transfer body, from the side of a leading end thereof, a plurality of corners in the proximal end of the pipe bite into the inner peripheral surface of the hole of the heat transfer body in a wedgewise manner to allow the pipe to be fixedly engaged with the heat transfer body by a strong press-contact force.

This makes it possible to achieve a reliable contact state between the heat transfer body and the pipe, while reducing frictional resistance in portions other than the corners having a maximum outer diameter, during the press-fitting.

The tubular-shaped substrate may have a proximal end of which trailing side is expanding in a flared shape.

In this mode, when the pipe is press-fitted into the hole, while positioning the proximal end of the tubular-shaped substitute on an upstream side of an insertion (press-fitting) direction, an outer surface of a portion of the flared end of the pipe on the side of the leading end thereof can be reliably brought into tight contact with the inner peripheral surface of the hole of the heat transfer body to improve the heat transfer efficiency.

Preferably, the pipe is press-fitted in the hole.

This makes it possible to ensure air-tightness between the heat transfer body and the pipe to more reliably enhance the oxidation resistance, while maintaining high heat transfer efficiency.

According to some embodiments of the present invention, there is provided an electric soldering iron which comprises the above heat transferring member, and a heating member inserted into the pipe of the heat transferring member, wherein a heat transfer body of the heat transferring member includes a iron tip adapted to melt solder by heat from the heating member to form a solder joint.

In the electric soldering iron of this embodiment, heat can be conducted from the heated heat transfer body to the iron tip to melt solder to form a solder joint. The iron tip may be integrated with the heat transfer body in a single piece, or may be formed as an independent or separate member.

According to some embodiments of the present invention, there is provided an electric desoldering tool which comprises the above heat transferring member, a heating member inserted into the pipe of the heat transferring member, and a sucking member provided to the heat transfer body of the heat transferring member and adapted to suck solder melted by heat conducted to the heat transfer body.

As above, the present invention can suppress oxidation of the heat transfer body of the heat transferring member while maintaining high heat transfer efficiency.

[Electric Soldering Iron]

Figure 19:
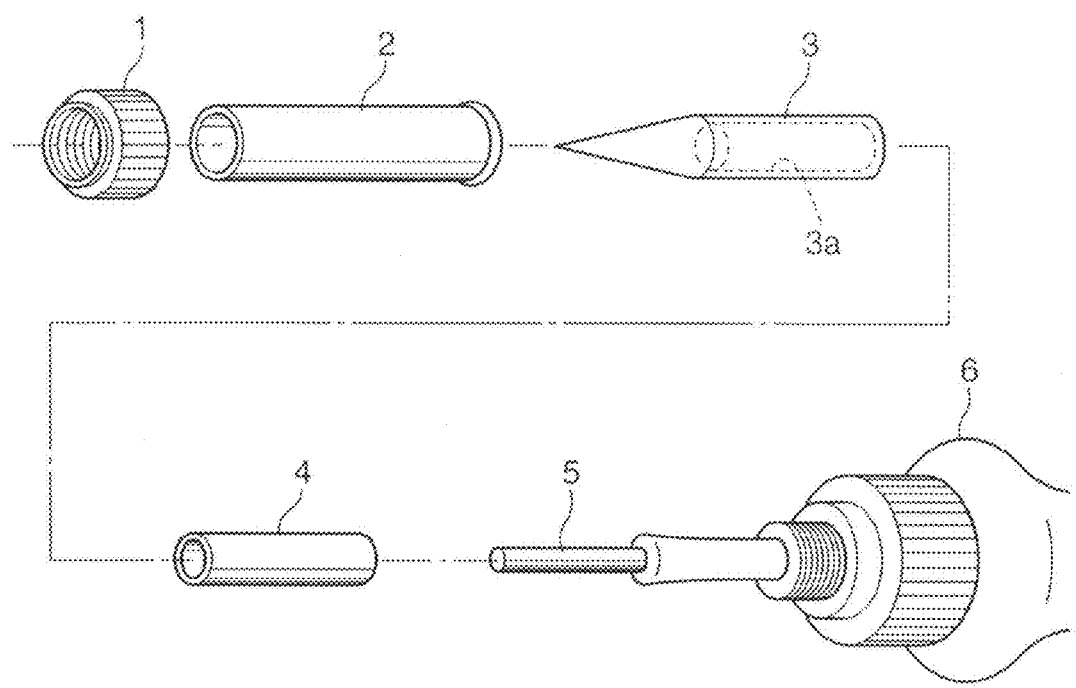
FIG. 19 is an exploded perspective view schematically showing a structure of the electric soldering iron according to embodiments of the present invention.

Referring now in more detail to the exemplary drawings for purposes of illustrating embodiments of the invention, wherein like reference numerals designate corresponding or like elements among the several views, there is shown in FIG. 19 an electric soldering iron that comprises a grip portion 6 and a bar-shaped heater 5 provided at an end of the grip portion 6 to serve as a heating member. The soldering iron further comprises a heat transfer body 3 of which basic portion is made of copper, a pipe 4 press-fitted in a hole 3a formed in the heat transfer body 3, a protective pipe 2 for fixing the heat transfer body 3 therethrough, and a nut 1 for connecting the heat transfer body 3 with the protective pipe 2 to the grip portion 6. A heat transferring member of this embodiment for a solder handling device is an assembly of the heat transfer body 3 and the pipe 4 press-fitted in the heat transfer body 3. In this heat transferring member, the pipe 4 is interposed between the heater 5 and an inner surface of the hole 3a of the heat transfer body 3, to play a role in receiving heat generated by the heater 5 to prevent the inner surface of the hole 3a in the heat transfer body 3 from being oxidized. If high-temperature thermal energy is conducted from the heater 5 directly to a copper surface of the heat transfer body 3, oxidation of the copper surface would be significantly accelerated. Therefore, the copper surface is subjected to a modification treatment, as described in detail later. Temperature control of the heater 5 is conducted in such an ON-OFF manner that a supply of electric power to the soldering iron is turned OFF when an internal temperature the soldering iron measured by a temperature sensor increases to become greater than a predetermined value, and is turned ON when the internal temperature of the soldering iron measured by the temperature sensor decreases to become equal to or less than the predetermined value.

In the above fundamental structure, the heat transferring member may be implemented in various ways, as described below.

First Embodiment

Figure 2:
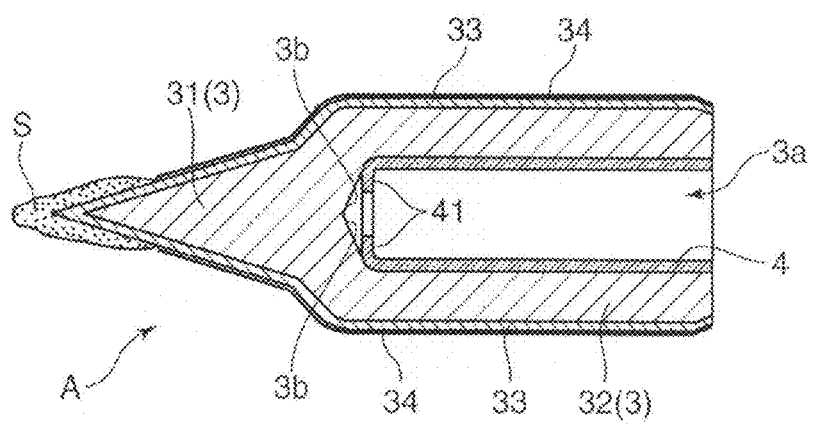
FIG. 2 is a sectional view of a heat transfer body having a pipe press-fitted in a hole thereof, in the heat transferring member for an electric soldering iron according to the first embodiment.

Referring to FIGS. 1 and 2, a copper-made heat transfer body 3 of a heat transferring member A according to a first embodiment for an electric solder handling device comprises a taper-shaped pointed head portion 31, and a heat transfer sleeve portion 32 integrated with the pointed head portion 31 and adapted to hold the heater 5.

The pointed head portion 31 serves as an iron tip for performing a soldering operation. The heat transfer sleeve portion 32 is a formed with a dead-ended hole 3a for receiving therein the heater 5 and holding the heater 5. The hole 3a defines a columnar-shaped space and has a diameter D0 and an opening opened on an opposite side of the pointed head portion.

In order to prevent the occurrence of a phenomenon that the copper basic portion ("core" or "core portion") of the heat transfer body is diffused into molten solder or so-called "erosion by solder", a layer or iron plating ("iron-plated layer") 33 is formed on an outer surface of the basic portion to have a thickness of about 300 μm (micrometers).

Furthermore, in order to prevent erosion and corrosion of the surface of the iron-plated layer 33 and oxidation of the surface under high-temperature environments, a layer of chromium plating ("chromium-plated layer") 34 is formed on the surface of the iron-plated layer 33 to have a thickness of about 20 μm. The chromium-plated layer 34 is not formed on a tip end of the pointed head portion 31. The tip end where the chromium plated layer 34 is not formed to expose the iron-plated layer 33 will be coated with tin or solder alloy S. An inner surface of the hole 3a of the heat transfer body 3 is not particularly subjected to a surface treatment in some embodiments of the invention.

With reference to FIGS. 2 to 5A and 5B, a pipe 4 has a tubular-shaped substrate made of copper, and an after-mentioned aluminum oxide passivation film is formed on a surface of the substrate. A surface modification treatment for the substrate will be described in detail later. In this first embodiment, oxygen-free copper is used as a copper material for the tubular-shaped substrate of the pipe 4 to maximally avoid release of oxygen from the copper material during heating in an inert atmosphere. Pure copper, such as tough pitch copper, or phosphorus deoxidized copper, may also be used in place of the oxygen-free copper. An outer diameter of the pipe 4 at a intermediate position thereof is set to be equal to or slightly greater than an inner diameter D0 (see FIG. 1) of the hole 3a (by about 0 mm to 0.05 mm). When the pipe 4 is press-fitted into the hole 3a, an outer surface of the pipe 4 is clamped by the inner surface of the hole 3a of the heat transfer body 3.

Figure 4:
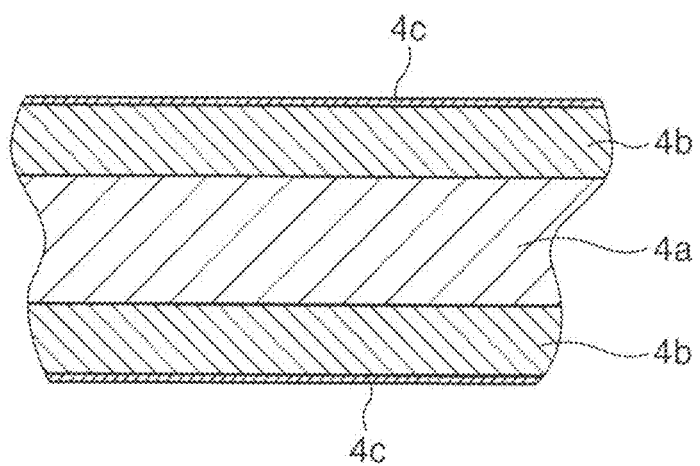
FIG. 4 is an enlarged view of an area IV in FIG. 3.

Referring to FIG. 4, in the first embodiment, a copper-aluminum alloy layer 4b having a thickness of about 15 μm to 30 μm is formed on both inner and outer peripheral surfaces of a copper layer 4a as the substrate of the pipe 4 by subjecting the surface of the copper layer 4a to a calorizing treatment (aluminizing treatment), and further a thin and strong aluminum oxide passivation film 4c having a thickness of 0.01 μm to 0.2 μm is formed as each of two outermost inner and outer peripheral surface layers of the pipe 4 through a natural reaction of the formed copper-aluminum alloy layer 4b to oxygen in atmospheric air. In this first embodiment, the two aluminum oxide passivation films 4c formed in the inner and outer surfaces of the pipe 4 will suppress oxidation of the inner surface of the hole 3a of the heat transfer body 3. Therefore, the pipe 4 press-inserted into the heat transfer body 3 provides a double passivation film formed along the inner surface of the hole 3a, thereby enhancing significantly the reliability of anti-oxidation capability.

The heater 5, which is formed in a generally bar-like shape, protrudes from an end of a grip portion of an electric soldering iron. In this first embodiment, a ceramic heater is used as the heater 5. The ceramic heater is an electric resistance heater-type heat generator using, as a heating element, a ceramic green sheet printed with a pattern of an electrically-conductive metal powder and is obtained by winding the ceramic green sheet around a ceramic core bar in a state of positioning a surface thereof printed with the pattern inwardly, and drying and sintering the obtained assembly.

A leading end of the ceramic heater includes a pattern for a temperature sensor. Based on a signal from the temperature sensor, a temperature of the heat transfer body during a soldering operation is controlled to be set to a given value.

Figure 3:
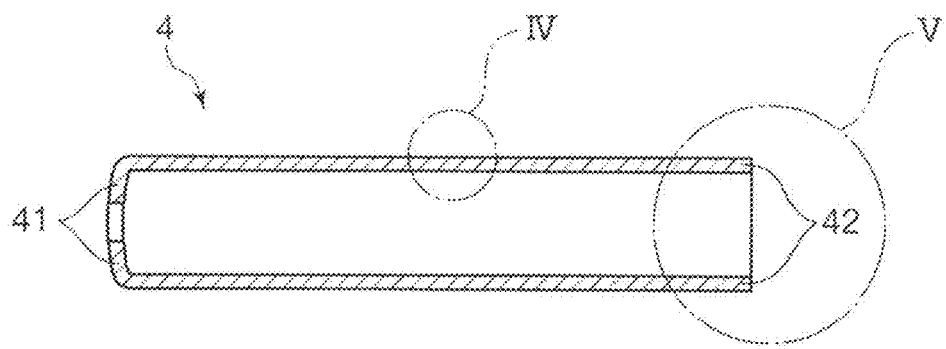
FIG. 3 is a sectional view for explaining the pipe in the first embodiment.

As shown in FIG. 3, the pipe 4 of the first embodiment has integrally an inwardly-extending flange 41 formed, for example, by a drawing process to have a diameter which decreases toward a distal end thereof. The flange 41 extends in a radially inward direction toward the central axis of the pipe 4. In FIG. 3, the central axis pipe 4 is horizontal and runs through the center of the pipe 4.

The inwardly-extending flange 41 serves as both a portion for partially covering a dead-end 3b (FIG. 2) of the hole 3a, and a jig-seating portion during the operation of press-fitting the pipe 4 into the hole 3a of the heat transfer body 3. The tubular-shaped substrate formed with such the inwardly-extending flange 41 enables to suppress oxidation of the dead-end 3b of the hole 3a despite of the tubular shape. In the first embodiment, a proximal end 42 of the pipe 4 is not subjected to a shape forming process. However, it may be subjected to a certain shape forming process, as described later. As used herein, the term "distal end" of the pipe 4 means a leading side of the pipe during the operation of press-fitting the pipe 4 into the hole 3a of the heat transfer body 3, whereas the term "proximal end" of the pipe 4 means an opposite (tailing) side of the distal end.

The pipe 4 is prepared by the following process according to some embodiments of the present invention. Firstly, a tube made of copper or copper alloy is cut into a given length. Then, the obtained tube is subjected to a shape forming process using a press machine or the like to form the inwardly-extending flange 41 (and a shaped portion in a proximal end of the tube, according to need), in such a manner as to allow the tube to have a shape suitable for converting the inner surface and the dead-end 3b of the hole 3a formed in the heat transfer body 3. In this manner, a tubular-shaped substrate is obtained. Subsequently, the tubular-shaped substrate is subjected to a surface modification treatment to obtain the pipe 4.

The shape forming process for the pipe 4 is performed before the surface modification treatment. This procedure of subjecting the pipe 4 to the surface modification treatment after the shape forming process makes it possible to prevent the occurrence of damage in the Cu—Al alloy during the press forming process.

Table 1 illustrates a difference in thermal expansion coefficient, thermal conductivity, specific heat and density between copper and stainless steel.

TABLE 1

| Material | Linear Expansion Coefficient [1/K] | Thermal Conductivity [W/(m · K)] | Specific Heat [J/(kg · K)] | Density [kg/m³] |
| --- | --- | --- | --- | --- |
| Copper | $16.8 \times 10^{-6}$ | 403 | 385 | 8920 |
| Stainless Steel 304 | $17.3 \times 10^{-6}$ | 17 | 460 | 7930 |

As shown in Table 1, there is a difference in thermal expansion coefficient between copper and stainless steel. In regard to expansion or shrinkage according to temperature changes, comparing one case where a pipe 4 made of copper is press-fitted into a heat transfer body made of copper, with another case where a pipe made of stainless steel is inserted into a heat transfer body made of copper, the stainless-steel pipe repeatedly undergoes large expansion or shrinkage. Therefore, in cases where a combination of a stainless-steel pipe and a copper heat transfer body would be employed, the pipe should be designed to have an outer diameter slightly less than an inner diameter of the hole of the heat transfer body in consideration of a difference in expansion or shrinkage between the heat transfer body and the pipe. This reduces contact tightness between the pipe and a surface of the hole of the heat transfer body, which is likely to cause deterioration in efficiency of heat transfer from a heater to the heat transfer body. Moreover, a gap would occur between the pipe and the surface of the hole of the heat transfer body, which would be likely to accelerate oxidation in the surface of the hole of the heat transfer body. Furthermore, if the resulting oxide scale is removed, a diameter of the hole would be changed to cause a risk of drop-off of the pipe.

In this first embodiment, the substrate of each of the pipe 4 and the heat transfer body 3 is made of the same material, i.e., copper.

Because the pipe 4 is made of a material substantially identical to that of the heat transfer body 3 for receiving therein the pipe 4, the respective thermal expansion coefficients of the pipe 4 and the heat transfer body 3 also become approximately equal to each other.

Therefore, when the heat transfer body 3 and the pipe 4 expand or shrink as the temperature changes, so do the heat transfer body 3 and the pipe 4 approximately integrally. This makes it possible to select a design scheme based on press-fitting allowing the pipe 4 to be brought into tight contact with the surface of the heat transfer body 3, so as to eliminate the risk of deterioration in efficiency of heat transfer from the heater 5 to the heat transfer body 3, and prevent the formation of oxide scales.

Further, as shown in Table 1, the thermal expansion coefficient of copper is greater than that of stainless steel, and the specific heat of copper is less than that of stainless steel. Therefore, in this first embodiment, copper is employed as a material for the tubular-shaped substrate to allow the pipe 4 to exhibit high heat transfer efficiency, as compared with case where stainless steel is employed as a material for the tubular-shaped substrate.

The press-fitting of the pipe 4 into the heat transfer body 3 is not limited to a specific operation, but may be an operation for manually performing the press-fitting on a one-by-one basis.

Alternatively, the press-fitting of the pipe 4 into the heat transfer body 3 may be performed using a press-fitting apparatus 60 (FIG. 7) having a pneumatically, hydraulically, or electrically-driven cylinder.

Figure 7:
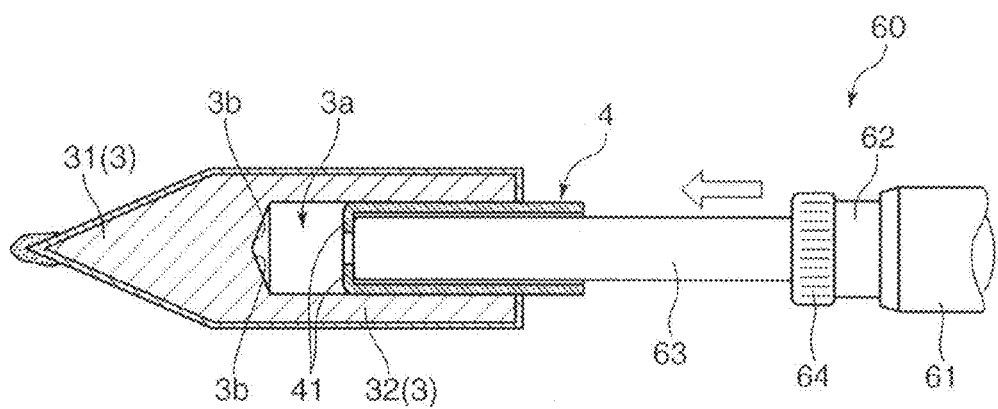
FIG. 7 is a diagram for explaining a state when the pipe in the first embodiment is press-fitted into the hole of the heat transfer body.

In one example illustrated in FIG. 7, a pneumatic pressure of 1 $kg/cm^2$ to 10 $kg/cm^2$ is supplied from a pneumatic-pressure supply source such as a compressor (not shown) to a pneumatic cylinder 61 of the press-fitting apparatus 60 to move a pneumatic piston 62 forwardly.

A pushrod 63 is connected to the pneumatic piston 62 through fastening means 64 such as a nut 64. The pushrod 63 is moved forwardly together with the pneumatic piston 62 and inserted into the pipe 4, while pushing an inner surface of the inwardly-extending flange 41 of the pipe 4 by a force of 20N or more, so that the pipe 4 is press-fitted toward the dead-end of the hole 3a of the heat transfer body 3.

The surface modification treatment for the pipe 4 will be specifically described below.

Generally, as a surface treatment method for metals, various techniques have been known: electroplating; chemical (electroless) plating; hot-dip plating; physical vapor deposition; ion plating; chemical vapor deposition; thermal spray coating; and diffusion modification. Depending upon an element to be diffused, the diffusion modification further includes various treatments such as a carburizing treatment (the element to be diffused is carbon (C)), a carbonitriding treatment (the element to be diffused is carbon (C) and nitrogen (N)), a calorizing treatment (the element to be diffused is aluminum (Al)), a chromizing treatment (the element to be diffused is chromium (Cr)), a sherardizing treatment (the element to be diffused is zinc (Zn)), and a boronizing treatment (the element to be diffused is boron (B)).

In regard to the diffusion modification, there is a classification by a type of medium, wherein it is classified into a gas process, a liquid process, and a solid process.

Among the above, the surface of the tubular-shaped copper substrate in this first embodiment is subjected to a calorizing treatment (aluminizing treatment) based on a pack cementation process to modify the surface to a Cu—Al alloy layer, and then an aluminum oxide passivation film is formed in the Cu—Al alloy layer through a reaction with oxygen in atmospheric air to obtain the pipe 4.

The pack cementation process comprises putting a penetrant as an element source (an aluminum powder or aluminum-containing alloy particles), an anti-sintering material (such as alumina, silica, kaolin, iron, iron-cobalt alloy, iron-aluminum alloy or aluminum containing alloy) and an activator (such as $NH_4F$, $NH_4Cl$, $NH_4I$, NaF, $AlF_3$, $AlCl_3$, $NH_4Br$, or $MgF_2$), into a container in the form of a pack mixture, and embedding a treatment target in the pack mixture, and heating the pack mixture with the target at a high temperature in the container filled with an inert gas. In this manner, aluminum is evenly diffused based on vapor phase diffusion of aluminum halide gas formed through a chemical reaction under the high temperature in addition to diffusion of solid aluminum directly from the aluminum powder (see U.S. Pat. No. 3,096, 160, entitled "Vapor diffusion coating process," which is incorporated herein by reference). The surface modification treatment for the tubular-shaped substrate using the pack cementation process is a thermal diffusion treatment, which provides an advantage of being free of pinholes.

In the first embodiment, the generally tubular-shaped pipe 4 having a through-hole is subjected to the surface modification treatment. Therefore, as compared with a technique of subjecting a surface of the concave-shaped non-through-hole cavity 3a formed in the heat transfer body 3 to a surface modification treatment, gas supplied into the tubular-shaped substrate during the surface modification treatment smoothly flows therethrough without stagnation of the gas flow. This makes it possible to homogenously surface-modify the pipe 4 in an easy manner.

Second Embodiment

In the first embodiment, the aluminum oxide film of the pipe for electric soldering device is formed through a natural reaction of oxygen in atmospheric air to a surface-modified layer which is obtained by an aluminizing treatment based on a pack cementation process. In a second embodiment of the present invention, an aluminum oxide film of a pipe is formed through a natural reaction of oxygen in atmospheric air to a surface-modified layer which is obtained by an aluminizing treatment based on a slurry coating process.

The slurry coating process is one type of diffusion treatment process which comprises applying a slurry mixture of an aluminum powder, an activator and a binder onto a treatment target, and then subjecting the target to a heating treatment in an inert gas atmosphere at a high temperature (see U.S. Pat. No. 7,030,339, entitled "Soldering iron tip with metal particle sintered member connected to heat conducting core," which is incorporated herein by reference). The surface modification treatment for a tubular-shaped substrate using the slurry coating process has an advantage of being able to be performed using a small-scale facility without a need for a large-scale facility, as compared with the surface modification treatment based on the pack cementation process.

In the slurry coating process, a slurry mixture obtained by kneading aluminum (Al) particles and fluoride-based flux together with a binder is firstly applied onto the entire outer and inner peripheral surfaces of a tubular-shaped substrate made of copper and formed in a given shape, and dried. Then, after completion of the drying, the tubular-shaped substrate is subjected to a heating treatment in an inert gas atmosphere. Through the heating treatment, only the Al particles are melted to modify each of the surfaces of the tubular-shaped substrate to a layer with a high Al concentration.

In the first and second embodiments, the pipe 4 having the aluminum oxide passivation film 4c formed on each of the inner and outer peripheral surfaces of the tubular-shaped copper or copper alloy substrate is press-fitted into the hole 3a formed in the heat transfer body 3. Therefore, even if the heat transfer body 3 would continuously receive high-temperature heat energy from the heater 5, the extremely stable aluminum oxide passivation film 4c formed on the surface of the pipe 4 would be able to suppress oxidation in the inner surface of the hole 3a of the heat transfer body 3. In addition, because the tubular-shaped substrate is made of copper having a high thermal conductivity, heat generated by the heater 5 is efficiently conducted to the heat transfer body 3 via the pipe 4. This makes it possible to suppress oxidation of the heat transfer body 3 while maintaining high heat transfer efficiency. More specifically, Applicants have observed the following:

(1) Oxidation resistance of the heat transfer body 3 is significantly improved, and therefore almost no oxide scale is formed even when the heat transfer body 3 is heated at a temperature of 600° C. (degrees C.) in atmospheric air for 1 hour. Although a temperature of a soldering iron during use is typically 400° C. (degrees C.) or less, a rise in temperature of the heater 5 would likely to be up to about 500° C. Even in such a case, the pipe 4 having the aluminum oxide film formed on the copper surface thereof can sufficiently fulfill a function of preventing oxidation of the heat transfer body 3.

(2) The improvement in heat transfer efficient makes it possible to simplify and facilitate a temperature control of the heat transfer body 3 during a soldering operation, as compared with a heat transferring member using a stainless-steel pipe.

(3) In the heat transfer body 3 having the copper pipe 4 subjected to the surface modification treatment and press-fitted thereinto, heat from the heater 5 is transferred with less heat loss, so that the desired temperature of the heat transfer body 3 is quickly recovered at start of use and during use.

As compared with conventional Sn—Pb eutectic solder, lead-free solder which is recently becoming popular, such as Sn—Ag—Cu alloy solder, Sn—Cu alloy solder, and Sn—Ag alloy solder, has a higher melting temperature, and more quickly erodes a soldering device or tool due to a higher content of tin (Sn). In this situation, the use of the electric soldering iron having high heat transfer efficiency, according to each of the above embodiments, makes it possible to facilitate a soldering operation using the lead-free solder to enhance soldering performance of an electric soldering iron.

In the conventional art, the inner surface of the hole 3a formed in the heat transfer body 3 is subjected directly to a modification treatment. Therefore, a chromized layer formed on an outer surface of the heat transfer body 3 is changed in color due to high-temperature heating of the heat transfer body 3 for the modification treatment. The change in color is a problem because it reduces the commercial value of the heat transfer body 3. In the above embodiments, however, the pipe 4 is subjected to the surface modification treatment, and therefore surface modification treatment of the heat transfer body is unnecessary, thereby avoiding the problem of color change in the chromized layer.

Third Embodiment

Figure 5A:
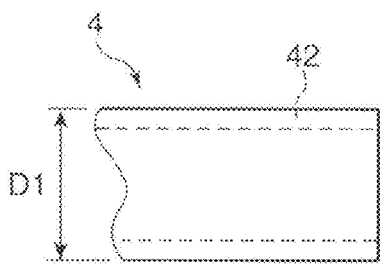
Figure 5B:
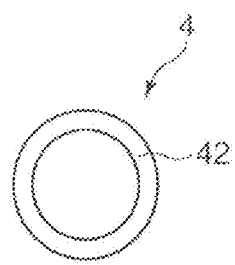
Figure 10A:
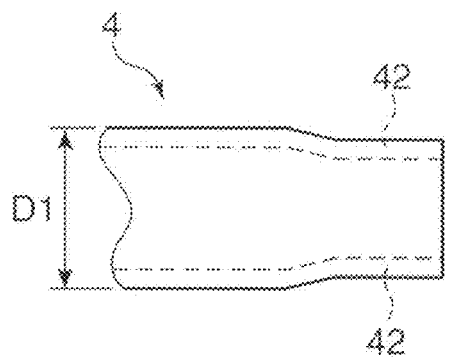
Figure 10B:
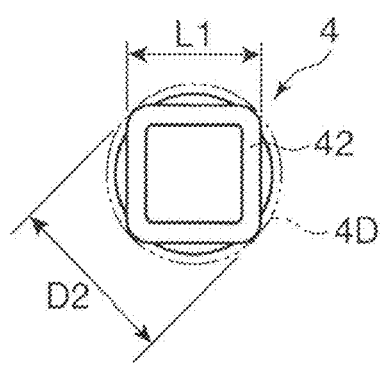

While the proximal end of the pipe 4 in the first and second embodiments is not particularly subjected to a shape forming process as shown in FIGS. 5A and 5B, the pipe 4 may have a proximal end formed in a generally rectangular shape (one example of a polygonal shape) in transverse cross-section as shown in FIGS. 10A and 10B.

In FIGS. 10A and 10B, the proximal end of the pipe 4 is formed in a square shape. A length L1 on the side of the square shape is set to be less than the inner diameter D0 (FIG. 1) of the hole 3a formed in the heat transfer body 3, and a diameter D2 of a circumscribed circle 4D about the square shape is set to be slightly greater than the inner diameter D0. Further, the pipe 4 is formed to satisfy the following relation: $D2 > D1 \geqq D0 > L1$, wherein D1 (FIG. 10A) is an outer diameter in an intermediate portion of the pipe 4. It will be appreciated that an interference fit relationship is formed between the pipe 4 and the heat transfer body 3 since D2 is greater than D0. With the press fitting and interference fit described herein, the pipe 4 may be optionally retained in the heat transfer body 3 exclusively by friction, without adhesives or other methods of attachment.

When the pipe 4 illustrated in FIGS. 10A and 10B is press-fitted into the hole 3a formed in the heat transfer body 3, four corners of the proximal end of the pipe 4 or corners having a maximum outer diameter (the diameter D2 of the circumscribed circle 4D) bite into the inner peripheral surface of the hole 3a of the heat transfer body 3 in a wedgewise manner to allow the pipe 4 to be fixedly engaged with the heat transfer body 3 by a strong press-contact force. This makes it possible to achieve a reliable contact between the heat transfer body 3 and the pipe 4, while reducing frictional resistance in portions other than the corners having a maximum outer diameter (i.e., portions of the pipe 4 distal to or in front of the square shape), during the press-fitting.

The configuration of the proximal end of the pipe 4 may be any suitable shape other than a rectangular shape, such as pentagonal, hexagonal, or octagonal shape.

Fourth Embodiment

Figure 11A:
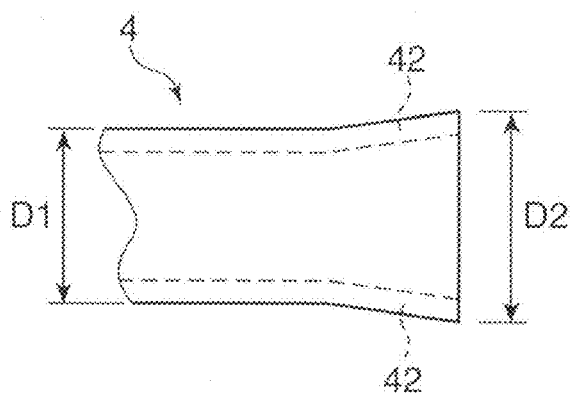
Figure 11B:
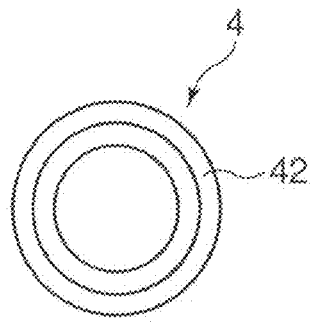

As shown in FIGS. 11A and 11B, a pipe 4 may be employed in which a proximal end thereof is formed in a flared shape to have an outer diameter which increases toward an upstream thereof.

The proximal end of the pipe 4 illustrated in FIGS. 11A and 11B is formed in a flared shape spread out toward the proximal end of the pipe 4. In this mode, given that an outer diameter of the proximal end of the pipe 4 is D2, the diameter D2 of the proximal end of the pipe 4 is set to be greater than the inner diameter D0 of the hole 3a of the heat transfer body 3, and the pipe 4 is further formed to satisfy the following relation: $D2 > D1 \geqq D0$, wherein D1 is an outer diameter in an intermediate portion of the pipe 4.

In the pipe 4 having the proximal end formed in a flared shape spread out toward the proximal end of the pipe 4, when the pipe 4 is press-fitted into the hole 3a, a contact between an outer surface of the pipe 4 and the inner peripheral surface of the hole 3a of the heat transfer body 3 becomes tighter in a portion the flared end of the pipe 4 on the side of the leading end thereof to ensure large press-fitting resistance. This makes it possible to improve the heat transfer efficiency.

Fifth Embodiment

The first to fourth embodiments have been described based on one example where the heat transfer body 3 comprises the pointed head portion 31 to be coated with solder and the sleeve portion formed with the hole 3a for receiving therein the pipe 4 and integrated with the pointed head portion 31. However, the present invention is not limited to configurations in which the head portion 31 and sleeve portion 32 are integral with each other (i.e., portions of a single component). The head portion 31 and sleeve portion 32 may be formed as an independent or separate component, as described below.

Figure 12:
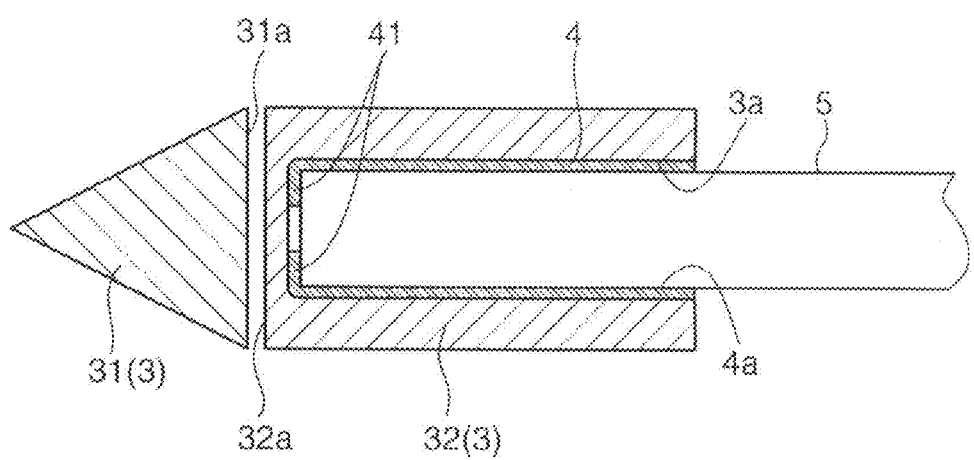
FIG. 12 is a diagram for explaining an electric soldering iron according to a fifth embodiment of the present invention.

Referring to FIG. 12, an electric soldering iron according to a fifth embodiment of the present invention comprises a heat transfer body 3 which has a pointed head portion 31 and a heat transfer sleeve portion 32 in a separable manner, wherein only the pointed head portion 31 serving as a iron tip is replaceable as a consumable component.

In this configuration, the heat transfer sleeve 32 also has a hole 3a formed therein. A pipe 4, such as the pipe 4 in the first embodiment, is also inserted into the hole 3a of the heat transfer sleeve portion 32 to receive a heater 5 in order to prevent oxidation of an inner surface of the hole 3a. The electric soldering iron illustrated in FIG. 12 is configured such that the pointed head portion 31 is pressed against the heat transfer sleeve portion 32 by a protective pipe (not shown) having an inner flange to allow a contact surface 32a of the heat transfer sleeve portion 32 to be brought into contact with a contact surface 31a of the pointed head portion 31 so as to conduct heat of the heater 5 to the pointed head portion 31 via the heat transfer sleeve portion 32. A coupling between the pointed head portion 31 and the heat transfer sleeve portion 32 may be a mutual coupling using a screw structure.

[Electric Desoldering Tool]

The first to fifth embodiments have been described based on examples wherein the pipe 4 is applied to an electric soldering iron. However, the present invention is not limited thereto but may be applied to an electric solder-sucking device or electric desoldering tool for melting solder and removing the melted solder, as shown in FIG. 13.

Sixth Embodiment

Figure 13:
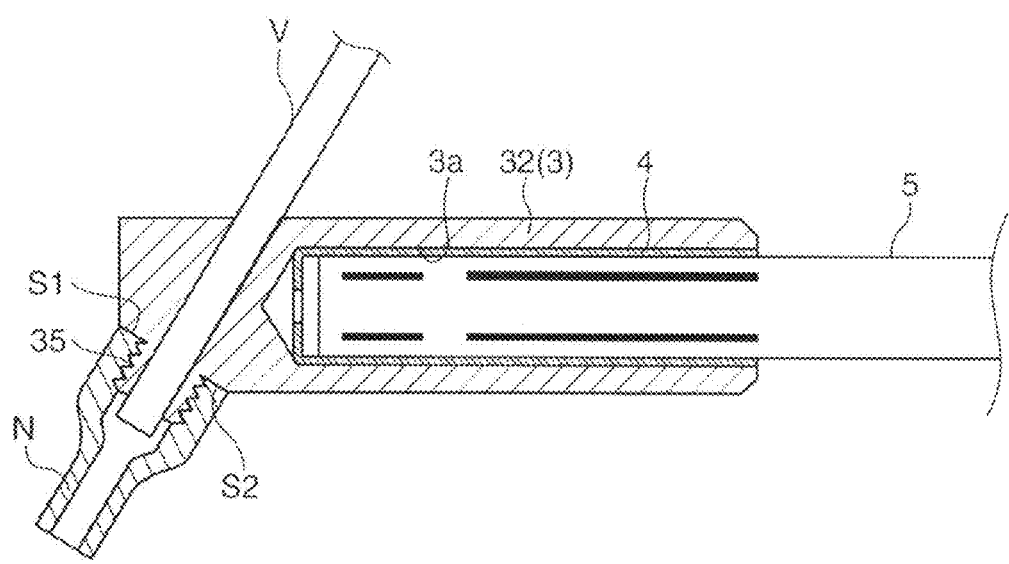
FIG. 13 is a diagram for explaining a structure of a solder-sucking device according to a sixth embodiment of the present invention.

Referring to FIG. 13, in an electric desoldering tool according to a sixth embodiment of the present invention, a sleeve-shaped heat transfer body 3 is formed in a sleeve shape having a tip portion. The tip portion is devoid of a pointed head portion. A solder-sucking nozzle (sucking member) N is provided at the tip portion ("leading end") of the heat transfer body 3. The leading end of the heat transfer body 3 is formed with a cylindrical-shaped screw portion 35, and the solder-sucking nozzle N is screwed with the screw portion 35 and coupled to the heat transfer body 3 in such a manner that a contact surface 51 of the nozzle N is brought into close contact with a contact surface S2 of the heat transfer sleeve portion 32. The heat transfer body 3 has a sucking pipe (sucking member) V connected thereto and inserted into the nozzle N after penetrating through the screw portion 35 to allow molten solder to be sucked from a free end of the nozzle N by a negative pressure from vacuuming means (not shown).

Further, as shown in FIG. 13, a pipe 4 equivalent to the pipe 4 in the first embodiment is press-fitted into a hole 3a provided in the heat transfer sleeve portion 32 of the heat transfer body 3.

In the sixth embodiment, an aluminum oxide film of the press-fitted pipe 4 also makes it possible to drastically improve oxidation resistance of the heat transfer body 3, while maintaining efficiency of heat transfer from a heating member to the heat transfer sleeve portion 32.

(Modifications)

Although the First to Sixth Embodiments have been Described Based Examples where an aluminum oxide passivation film is formed on each of inner and outer surfaces of the pipe 4, the present invention is not limited thereto. As long as the aluminum oxide passivation film is formed at least on peripheral surfaces (either the inner or outer surface) of the pipe 4, the formation of oxide scales can be suppressed.

Although the first to sixth embodiments have been described based examples where a ceramic heater is used as the heater 5, the present invention is not limited thereto but a sheathed electric resistance heater may be used as the heater 5.

Although the first to sixth embodiments have been described based examples where a temperature of the electric soldering iron or the electric desoldering tool is ON-OFF controlled, the present invention is not limited to such ON-OFF control. For example, the temperature of the electric soldering iron or the electric desoldering tool may be controlled by continuously changing an amount of supply current.

Although the first to sixth embodiments have been described based examples where the copper surface is subjected to an aluminizing treatment using a pack cementation process or a slurry coating process, the present invention is not limited thereto. For example, the aluminizing treatment may be a diffusion treatment comprising immersing a target into molten aluminum and then subjecting the resulting target to a heat treatment at a high temperature (see U.S. Pat. No. 4,517,229, entitled "Diffusion treated hot-dip aluminum coated steel and method of treating," which is incorporated herein by reference).

Although the first to sixth embodiments have been described based examples where the tubular substrate is made of pure copper, such as oxygen-free copper, the present invention is not limited thereto, but the tubular substrate may be made of a copper alloy, such as silver-containing copper or copper-iron alloy.

In some embodiments, the tubular substrate of the pipe 4 is made entirely of copper. In some embodiments, the tubular substrate of the pipe 4 is made of a copper alloy that includes over 70 weight % copper, or is over 80 weight % copper, or is over 90 weight % copper, or is over 95 weight % copper, or is over 98 weight % copper.

In some embodiments, the pipe 4 does not have the flange 41 at its distal end. In some embodiments, the pipe does not have a through hole at its distal end so that the distal end is completely closed. In some embodiments, the pipe has walls that extend entirely around in a circumferential direction, as shown in FIG. 5B. In some embodiments, the pipe has walls that do not extend entirely around in a circumferential direction, wherein the pipe has a slit or gap which may extend from the pipe distal end toward the pipe proximal end.

In some embodiments, the pipe 4 is disposed in the heat transfer body 3 but does not extend outside of the heat transfer sleeve portion 32, as shown in FIG. 2. In some embodiments, the pipe is disposed in the heat transfer body 3 and extends outside of the heat transfer sleeve portion.

In some embodiments, the pipe 4 is disposed in the heat transfer body 3 and extends along the entire longitudinal length of the cavity 3a formed in the heat transfer body, from the opening of the heat transfer sleeve portion 32 to the dead-end of the heat transfer sleeve portion, as shown in FIG. 2. As used herein, the entire longitudinal length of the cavity 3a runs horizontally in FIGS. 1 and 2, continuously from the proximal end opening (right side) to the dead-end 3b (left side). In some embodiments, the pipe is disposed in the heat transfer body 3 but does not extend to the dead-end of the heat transfer sleeve portion. In some embodiments, the pipe is disposed in the heat transfer body 3 but does not extend along the entire longitudinal length of the cavity 3a formed in the heat transfer body.

In some embodiments, the aluminum oxide passivation film 4c extends along the entire longitudinal length of the pipe 4. As used herein, the entire longitudinal length of the pipe 4 runs horizontally in FIG. 3, continuously from the proximal end 42 (right side) to flange 41 (left side). In some embodiments, the aluminum oxide passivation film extends along a segment of the longitudinal length of the pipe and does not extend along the entire longitudinal length of the pipe.

In some embodiments, a surface modification treatment, such as those previously described above for inhibiting oxidation of the cavity 3a of the heat transfer body 3, is performed only on a surface of the substrate of the pipe 4 and is not performed on any interior surface of the cavity 3a of the heat transfer body 3. In some embodiments, the pipe 4 includes a passivation film over the pipe substrate, and the heat transfer body 3 itself does not include a passivation film on any interior surface of the cavity 3a.

In some embodiments, a surface modification treatment for inhibiting oxidation of a surface is performed on a surface of the substrate of the pipe 4 and an interior surface of the cavity of the heat transfer body. In some embodiments, the pipe 4 includes a passivation film over the pipe substrate, and the heat transfer body 3 includes a passivation film on an interior surface of the cavity 3a.

In some embodiments, the heater 5 is configured to generate sufficient thermal energy to bring the pointed head portion 31 to a temperature of at least 300° C., and more preferably at least 400° C. In some embodiments, the inner and outer surfaces of the pipe 4 have an area of sufficient size that allows thermal energy from the heater 5 to be conducted through the pipe 4 and into the heat transfer body 3 so that the pointed head portion 31 reaches at least 300° C., and more preferably at least 400° C.

EXAMPLES

The present invention will be more specifically described below based on various examples. It is understood that the present invention is not limited to such examples, but various changes and modifications may be made without departing from the scope of the present invention hereinafter defined.

Example 1

Surface Modification Treatment in First Embodiment

In Example 1, surface modification is performed using 20 weight % of aluminum powder as an element source, 79.5 weight % of alumina particles as an anti-sintering agent and 0.5 weight % of ammonium chloride ($NH_4Cl$) were charged into a container in the form of a pack mixture.

A tubular-shaped substrate made of oxygen-free copper, as a treatment target, was embedded in the pack mixture, and the container was filled with argon (Ar) gas to remove air including oxygen. Then, the target embedded in the pack mixture was subjected to a heating treatment at a temperature of 500° C. to 800° C. for 15 hours.

In the above manner, aluminum was diffused in a surface of the tubular-shaped substrate made of copper to form a Cu—Al layer (copper-aluminum alloy layer) with a high concentration of aluminum.

Subsequently, the treatment target was taken out of the container, and exposed to atmospheric air to naturally form a dense ammonium oxide ($Al_2O_3$) layer through a natural reaction of oxygen in atmospheric air to aluminum in an outermost surface of the Cu—Al alloy layer.

The formed oxide layer will prevent subsequent oxidation of the tubular-shaped substrate.

A particle size of the aluminum (Al) powder is preferably 50 μm or more in view of anti-ignition, more preferably 150 μm or less for a reason of maximizing a contact with the treatment target to facilitate the diffusion. Preferably, an amount of oxygen contained in the aluminum (Al) powder is 1 weight % or more. The particle size and the oxygen content of the aluminum (Al) powder thus specified to the above range ensure properties of the aluminum (Al) powder suitable as a surface of a pipe 4.

In Example 1, alumina particles were used as an anti-sintering agent. Alternatively, pulverized particles of Fe—Al alloy may be used as the anti-sintering agent. In the case of using the pulverized particles of Fe—Al alloy, the Fe—Al particles may be used as an element source, or an aluminum powder may be additionally used as the element source in combination with the pulverized particles of Fe—Al alloy.

Particularly, when an amount of aluminum (Al) contained in the Fe—Al alloy is in the range of 19 weight % to 50 weight %, aluminum (Al) can be accumulated in the anti-sintering agent at a high concentration in the form of an alloy to efficiently serve as a medium for assisting solid-solid diffusion of aluminum into the treatment target.

Even if an iron-based material is used as a medium material for mediating diffusion or penetration of aluminum into a copper product, the formation of an intermediate phase, such as $FeAl_3$, is suppressed. The reason of this is that a vapor pressure of aluminum (Al) or aluminum chloride gas is fairly greater than that of iron (Fe) or iron chloride gas, whereas a vapor pressure in equilibrium with an element source powder is close to a vapor pressure of pure aluminum (Al), and thereby an element being vaporized/gasified within a furnace at a treatment temperature is only aluminum and aluminum chloride gas.

As the anti-sintering agent, a pulverized material having a particle size of about 500 μm to 5000 μm may be used. The use of the anti-sintering agent having such a particle size makes it possible to ensure an interspace suitable for allowing aluminum chloride gas in the vapor phase to pass through the anti-sintering agent.

Such diffusion or penetration is caused by a direct solid-solid reaction and the following chemical reaction with a vapor phase, to form a diffused alloy layer having relatively excellent homogeneity.

First Stage: Activation of Halide Ammonia chloride ($NH_4Cl$) is used as an activator to produce hydrogen chloride gas by thermal decomposition of the activator, and the hydrogen chloride gas reacts with an aluminum metal powder in a penetrant as a metal halide to produce aluminum chloride gas.

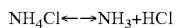
$$NH_4Cl \leftrightarrow NH_3 + HCl$$

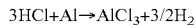
$$3HCl + Al \rightarrow AlCl_3 + 3/2 H_2$$

Second Stage: Deposition of Active Metal

The activated aluminum chloride gas is filled in an interspace of solid alumina to cause deposition of active aluminum metal on a surface of a treatment target (copper).

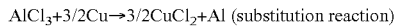
$$AlCl_3 + 3/2 Cu \rightarrow 3/2 CuCl_2 + Al \text{ (substitution reaction)}$$

$$AlCl_3 + 3/2 H_2 \rightarrow 3HCl + Al \text{ (reduction reaction)}$$

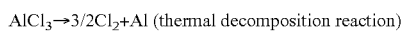
$$AlCl_3 \rightarrow 3/2 Cl_2 + Al \text{ (thermal decomposition reaction)}$$

Third Stage Thermal Diffusion

The active aluminum metal deposited on the surface of the treatment target (copper) is diffused in the copper (Cu) to form a Cu—Al alloy layer.

Figure 8:
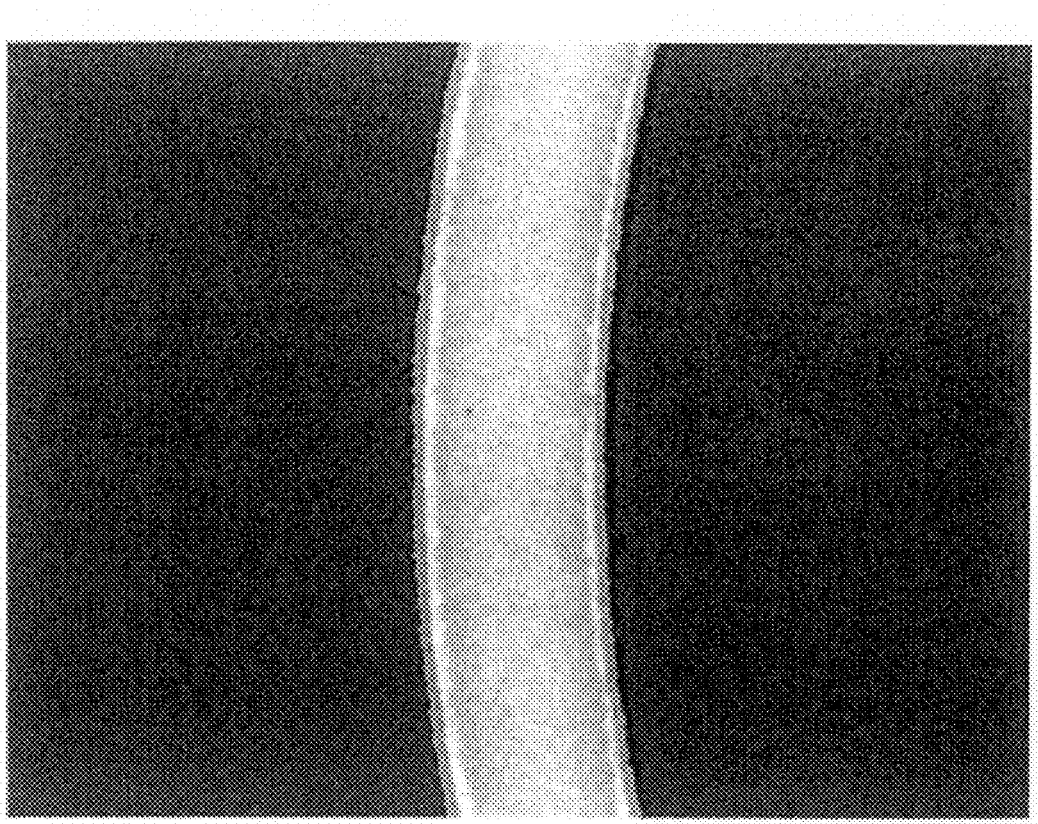
FIG. 8 is a photograph representing an enlarged cross-section of an intermediate region of the tubular-shaped copper substrate in the first embodiment, which shows a thickness of a copper-aluminum alloy layer obtained by diffusing aluminum in the surface of the tubular-shaped copper substrate using a pack cementation process.
Figure 9:
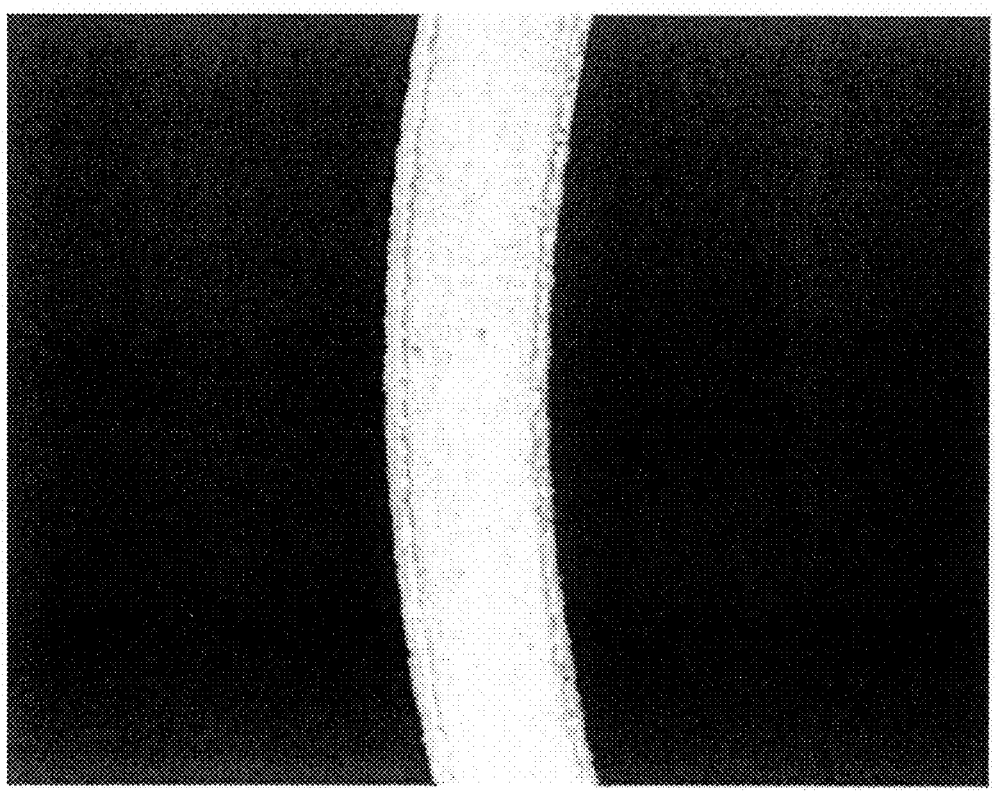
FIG. 9 is a photograph representing an enlarged cross-section of a proximal end region of the tubular-shaped copper substrate in the first embodiment, which shows a thickness of a copper-aluminum alloy layer obtained by diffusing aluminum in the surface of the tubular-shaped copper substrate using a pack cementation process.

FIGS. 8 and 9 are photographs representing an enlarged cross-section of a tubular-shaped copper substrate, which shows a thickness of a Cu—Al alloy layer obtained by diffusing aluminum (Al) in a surface of the tubular-shaped copper substrate using a pack cementation process, wherein FIG. 8 is a photograph representing an enlarged cross-section of an intermediate region of the tubular-shaped substrate, and FIG. 9 is a photograph representing an enlarged cross-section of a proximal end region of the tubular-shaped substrate.

Each of the photographs in FIGS. 8 and 9 shows a microscopic measurement result of a thickness of a Cu—Al alloy layer in a cut surface of a pipe 4 after being subjected a pack cementation process.

The pipe 4 as a sample was obtained in such a manner that a tubular-shaped oxygen-free copper substrate having an outer diameter of 4.4 mm and a leading end subjected to a drawing process is embedded in a pack mixture comprising 20% of aluminum (Al) and 0.5% of ammonia chloride ($NH_4Cl$), in a laid-down posture, and the pack mixture is subjected to a heating treatment in an argon (Ar) gas at a temperature of 500° C. within a small electric furnace.

In the proximal end region of the pipe 4, the thickness of the Cu—Al alloy layer is about 25 μm in an outer peripheral surface of the pipe 4, and about 20 μm in an inner peripheral surface of the pipe 4. In the intermediate region of the pipe 4, the thickness of the Cu—Al alloy layer is about 25 μm in the outer peripheral surface of the pipe 4, and about 15 μm in the inner peripheral surface of the pipe 4. These results show that the thickness of the Cu—Al alloy layer formed on an inner peripheral surface of the tubular-shaped substrate is less than that of the Cu—Al alloy layer formed on an outer peripheral surface of the tubular-shaped substrate. A state of gas flow during the heat treatment is different between an inside and an outside of the tubular-shaped substrate, and thereby the thickness of the Cu—Al alloy layer formed in the inner peripheral surface of the pipe 4 becomes slightly less than that of the Cu—Al alloy layer formed in the outer peripheral surface of the pipe 4. Even in this situation, a Cu—Al alloy layer having a thickness enough to form an aluminum oxide passivation film can be obtained on both inner and outer surfaces of the tubular-shaped substrate.

Example 2

Aluminizing Treatment based on Slurry Coating Process

Example 2 is a specific example of an aluminizing treatment based on a slurry coating process, as described above for the second embodiment.

In Example 2, a mixture of 80 weight % of aluminum (Al) particles and 20 weight % of flux was kneaded together with a binder to obtain a slurry mixture. Then, the slurry mixture was applied onto both outer and inner peripheral surfaces of a tubular-shaped copper substrate to have a thickness (or distribution) of 2 mg/cm² to 5 mg/cm². Then, the tubular-shaped copper substrate was subjected to a heating treatment within a nitrogen gas atmosphere at 100° C. to melt aluminum (Al). Although a Cu—Al based alloy is melted by a eutectic reaction at 548° C., aluminum (Al) is diffused in this treatment under a condition that a rise in treatment temperature is up to a melting point of aluminum (Al) or 660° C. or more in order to produce a sufficient reaction between aluminum (Al) and copper (Cu). Subsequently, the treatment target was taken out of the furnace, and cooled naturally. During the cooling, an aluminum oxide ($Al_2O_3$) passivation film is formed through a reaction of oxygen in atmospheric air to aluminum (Al) in a modified layer in a surface of the treatment target.

Preferably, a particle size of the aluminum (Al) particles is 150 μm or less, and an amount of oxygen contained in the aluminum (Al) particles is 1 weight % or less. The particle size and the oxygen content of the aluminum (Al) powder are specified to the above range to ensure properties of the aluminum (Al) powder suitable as a surface of a pipe 4.

As the flux, Halide, such as ammonium fluoride ($NH_4F$) or ammonia chloride ($NH_4Cl$) may be used.

Comparison Test on Oxidation Resistance

Figure 6:
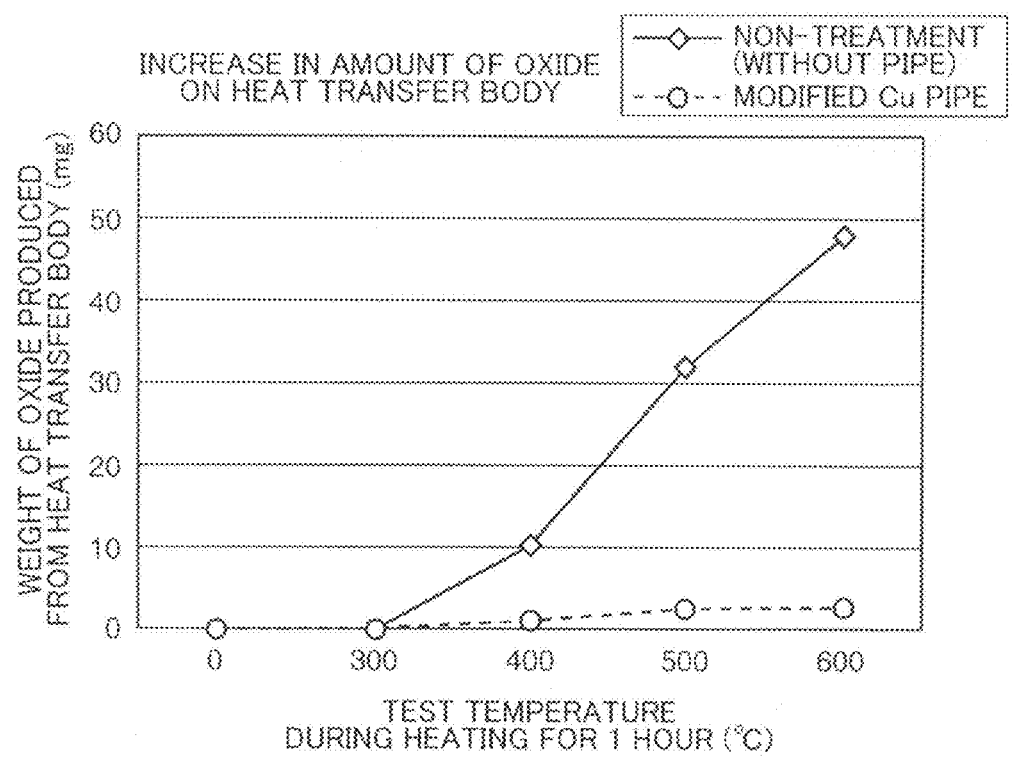
FIG. 6 is a graph showing a test result, wherein an amount of oxide on a heat transfer body in which the pipe having the tubular-shaped substrate with the copper surface modified in the first embodiment (Example 1) is press-fitted into a hole of the heat transfer body is compared with an amount of oxide on a heat transfer body devoid of measures against oxidization of a surface of a hole thereof.

FIG. 6 is a graph showing a test result, wherein an amount of oxide on a heat transfer body 3 in which the pipe 4 with the copper surface modified in Example 1 is press-fitted into a hole 3a of the heat transfer body 3, is compared with an amount of oxide on a heat transfer body having a hole with a non-treated surface. More specifically, each of a heat transfer body 3 having a pipe 4 subjected to a surface modification treatment and press-fitted therein, and a heat transfer body formed with a hole 3a having neither the pipe 4 inserted therein nor a surface subjected to a surface modification treatment, was heated for 1 hour while gradually increasing a test temperature to 300° C., 400° C., 500° C., and 600° C. in atmospheric air within a furnace.

After the heating, a weight of each of the heat transfer bodies as a sample was measured using a precision balance. The graph in FIG. 6 represents an increase in weight as an increase in amount of oxide.

As seen in FIG. 6, the weight of oxide in the heat transfer body having the hole 3a with a non-treated surface was sharply increased when the test temperature becomes greater than 300° C. In contrast, the weight of oxide is barely included in the heat transfer body 3 where the pipe 4 with the copper surface modified to have an aluminum oxide passivation film as in the above embodiments is press-fitted into the hole 3a of the heat transfer body 3, even if the test temperature becomes greater than 300° C.

As above, the use of the pipe 4 having an aluminum oxide passivation film formed in the surface thereof makes it possible to suppress oxidation in the surface of the hole 3a of the heat transfer body 3 even under high-temperature environments. Even if the aluminum oxide passivation film be damaged, a natural film of aluminum oxide would be quickly re-formed when the Cu—Al alloy layer is exposed to atmospheric air to maintain oxidation resistance.

Comparison Test on Heat Transfer Efficiency

A comparison test on heat transfer efficiency between an "inventive example" and a "comparative example" was carried out. The inventive example was an electric soldering iron (heat transferring member) using the pipe subjected to the surface modification treatment in Example 1. The comparative example was an electric soldering iron (heat transferring member) using a conventional stainless-steel insert pipe. In the heat-transfer-efficiency comparison test, a "multiple-workpiece test" and "large-workpiece test" were carried out using a test apparatus illustrated in FIG. 14. The "multiple-workpiece test" is intended to evaluate heat transfer efficiency in a soldering operation for a large number of workpieces requiring a small or intermediate heat capacity. The "large-workpiece test" is intended to evaluate heat transfer efficiency in a soldering operation for a workpieces requiring a large heat capacity.

(Test Apparatus)

Figure 14:
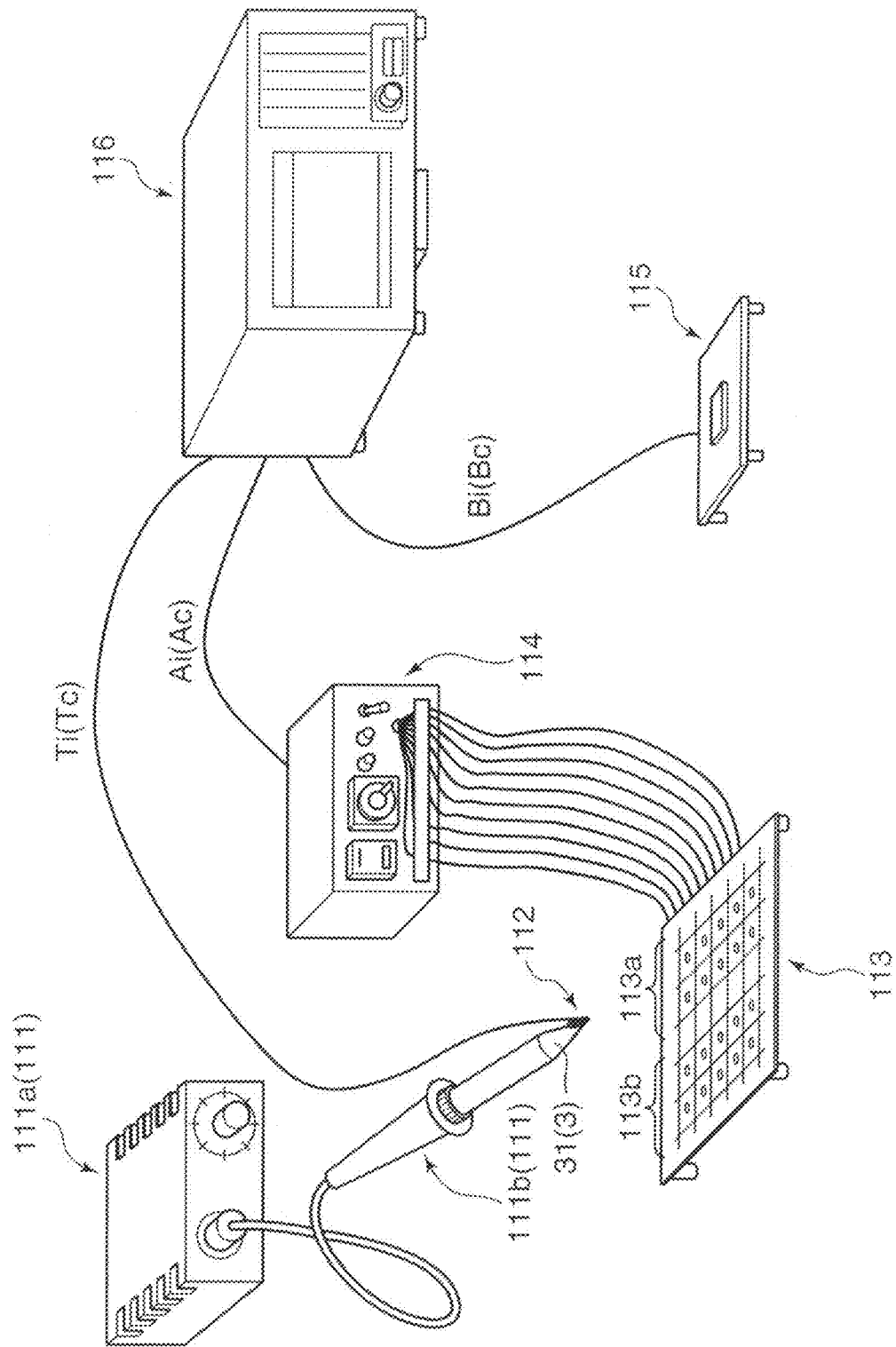
FIG. 14 is a diagram for explaining a test apparatus for a heat-transfer-efficiency comparison test with respect to the inventive example.

FIG. 14 is a diagram for explaining a test apparatus for use in measuring a change in temperature of an iron tip and a change in detection temperature of a soldering target. The test apparatus comprises a soldering device 111, a multiple-workpiece test board 113, a controller 114, a large-workpiece test board 115, and a recorder 116.

The soldering device 111 includes a temperature control unit 111a, and an electric soldering iron 111b (used in each of inventive and comparative examples).

Based on a detection signal from a temperature sensor installed inside a ceramic heater and in consideration of a difference between respective temperatures in a predetermined sensor position and in a soldering operation area of a pointed head portion (iron tip) of a heat transfer body 3, the temperature control unit 111a is operable to ON-Off control a current to be supplied to the heater in such a manner that the temperature in the operation area of the pointed head portion 31 becomes equal to a given temperature.

The electric soldering iron 111b has a fundamental structure approximately identical to that of the electric soldering iron illustrated in FIG. 19 using a ceramic heater as a heating member, and includes a heat transferring member in a replaceable manner. Using the soldering iron 111b, both the heat transferring members in Example 1 and comparative example were subjected to "multiple-workpiece" and "large-workpiece" tests which were conducted continuously. The temperature of the pointed head portion (hereinafter referred to as "soldering-tip temperature" on a case-by-case basis) was measured by a chromel-alumel thermocouple.

The chromel-alumel thermocouple has a temperature-measuring portion 112 arranged to be in contact with a vicinity of the operation region of the pointed head portion so as to directly measure the soldering-tip temperature. The temperature-measuring portion 112 is electrically connected to the recorder 116 to output a detection signal to the recorder 116.

The multiple-workpiece test board 113 is formed by simulating a large number (twenty in this test apparatus) of workpieces requiring a small or intermediate heat capacity. In this test, first and second multiple-workpiece test boards 113a and 113b each having a different size were used.

The first multiple-workpiece test board 113a is a printed-wiring board of double-sided copper-clad laminate made from woven glass fiber material impregnated with epoxy resin, and having a size of 110 mm length, 111 mm width, and 2 mm thickness. A copper foil on each surface thereof is divided by etching into a plurality of square sections, each 10 mm on a side. A cylindrical through-hole pin having an outer diameter φ of 1.5 mm is fixed at a center of each of the divided small sections penetrating through the board, and ten soldering-tip contact sections (simulated workpieces) each made of copper and formed to have a diameter φ of 2.0 mm are provided on an upper surface of the board.

The second multiple-workpiece test board 113b is a printed-wiring board of double-sided copper-clad laminate made from woven glass fiber material impregnated with epoxy resin, which is prepared by changing a value of each of the outer diameter of the cylindrical through-hole pin and the diameter of each of the copper soldering-tip contact sections in the first multiple-workpiece test board 113a. Specifically, the outer diameter φ of the cylindrical through-hole pin is 2.0 mm, and the diameter of each of the ten copper soldering-tip contact sections is 3.0 mm. A temperature-measuring chromel-alumel thermocouple is provided on a back side of each of the test boards 113a and 113b, with respect to each of the soldering-tip contact sections, and connected to the controller 114.

The controller 114 is operable to recognize respective detection signals from the plurality of chromel-alumel thermocouples provided in the multiple-workpiece test board 113, and ultimately output a single sequential temperature signal to the recorder 116 while arranging respective temperature signals of the first and second multiple-workpiece test boards 113a and 113b in order of measurement timing.

The large-workpiece test board 115 is formed by simulating a large workpiece requiring a large heat capacity. The large-workpiece test board 115 comprises a ceramic board having a size of 100 mm length, 40 mm width and 5 mm thickness. A copper bar formed to have an outer diameter of 6 mm and a length of 10 mm is fixed to a center of the ceramic board. A soldering-tip contact portion, formed as an oblong-shaped copper plate having a size of 10 mm length, 5 mm width, and 2 mm thickness, is mounted on an upper surface of the board. A temperature-measuring chromel-alumel thermocouple is attached to a back side of the large-workpiece test board 115 to output a temperature signal of the large-workpiece test board 115, and directly connected to the recorder 116.

The recorder 116 is a processing unit comprising a display for displaying a wavy line based on the detection signal input from the controller 114 or the large-workpiece test board 115, and operable to store data about a result based on the input signal, in a given storage device, and output the data (e.g., print out the data or transmit the data via a communication line).

(Test Target)

As the inventive example, a pipe 4 was prepared by subjecting a surface of a tubular-shaped copper substrate of a heat transfer body identical to that described in the first embodiment, to a calorizing treatment (aluminizing treatment) based on the pack cementation process described in Example 1 to modify the surface to a Cu—Al alloy layer, and forming an aluminum oxide passivation film in the Cu—Al alloy layer through a reaction with oxygen in atmospheric air, and then the obtained pipe 4 was assembled to the heat transfer body 3 through the press-fitting operation described in connection with FIG. 7 to obtain a heat transferring member 3.

As the comparative example, there is prepared a heat transferring member different from the heat transferring member 3 in the inventive example, in that the pipe 4 is made of stainless steel (i.e., without an aluminum film and without an aluminum oxide passivation film).

(Test Procedure)

A state of soldering using lead-free solder was created in a mock manner, as follows.

In a soldering operation using lead-free solder, a soldering-tip temperature of a soldering iron is typically controlled to be about 350° C. A soldering-tip temperature of the soldering iron 111b thus rose up to 350° C., while being calibrated, to set a heating condition.

More specifically, an operator adjusted a setting value of the temperature control unit 111a by gradually raising a control level of the temperature control unit 111a to allow a temperature value from the thermocouple 112 attached to the pointed head 31 of the heat transfer body 3 to become equal to 350° C. in a no-load state, while checking a soldering-tip temperature based on a detection signal of the temperature-measuring portion 112, by the display of the recorder 116.

After completion of the setting of the temperature control unit 111a, the operator turned off a power switch of the electric soldering iron to lower the soldering-tip temperature to a given value (50° C. in this test).

Figure 15:
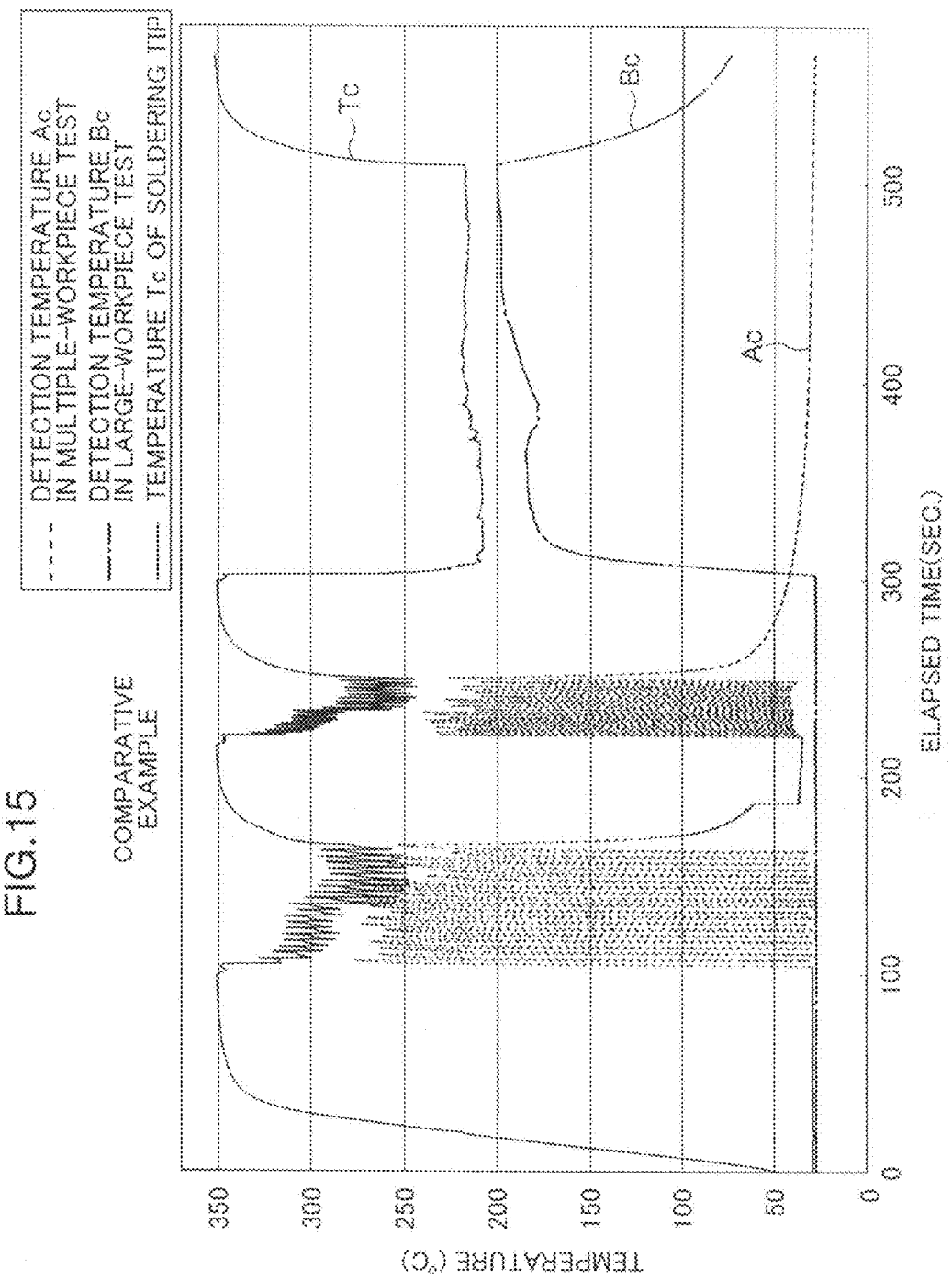
FIG. 15 is a graph showing a result of a heat-transfer-efficiency comparison test for the comparative example, wherein a stainless-steel pipe was used in an electric soldering iron.
Figure 16:
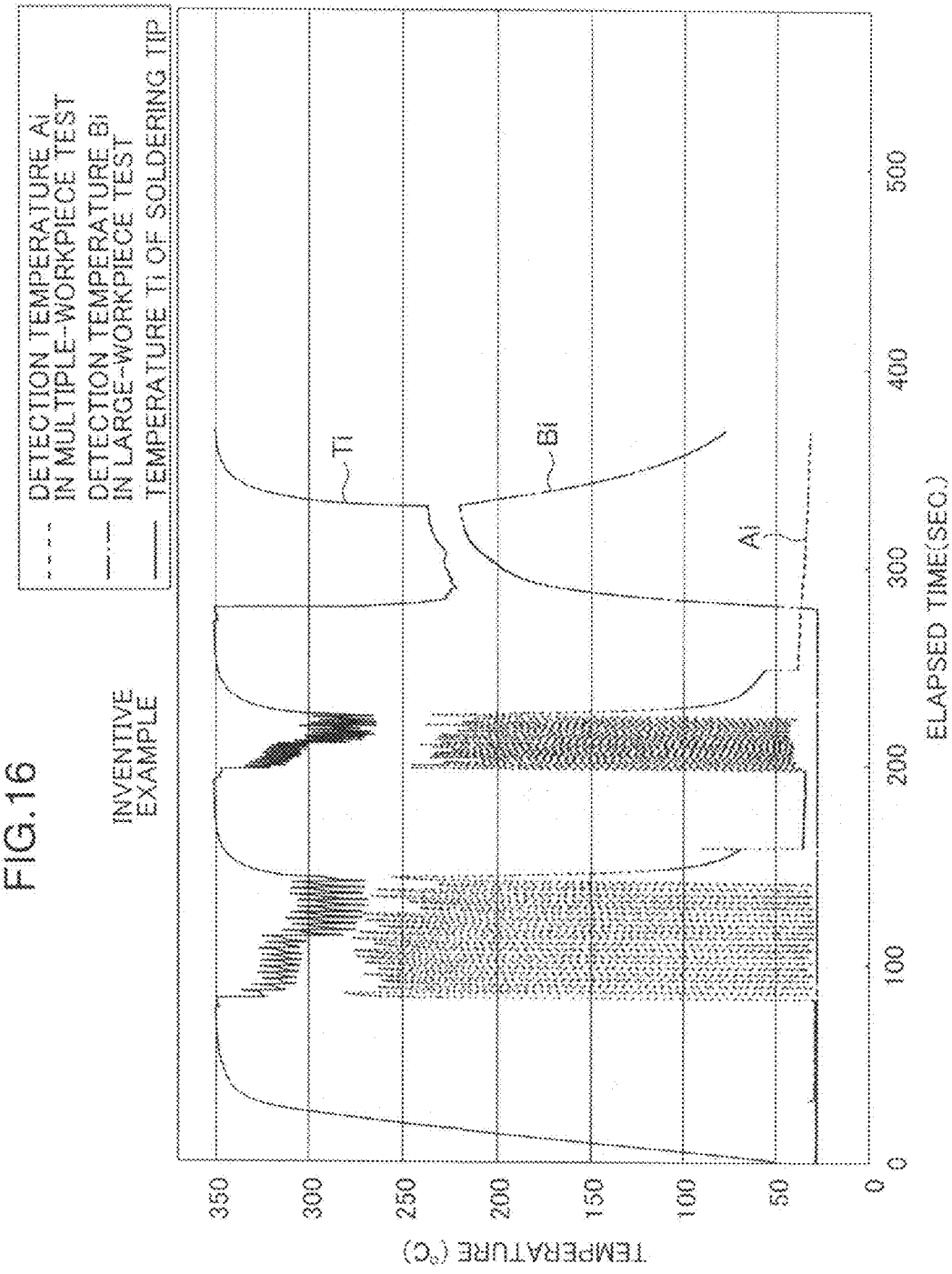
FIG. 16 is a graph showing a result of a heat-transfer-efficiency comparison test for the inventive example, wherein a copper pipe subjected to a surface modification treatment was used in an electric soldering iron.
Figure 17:
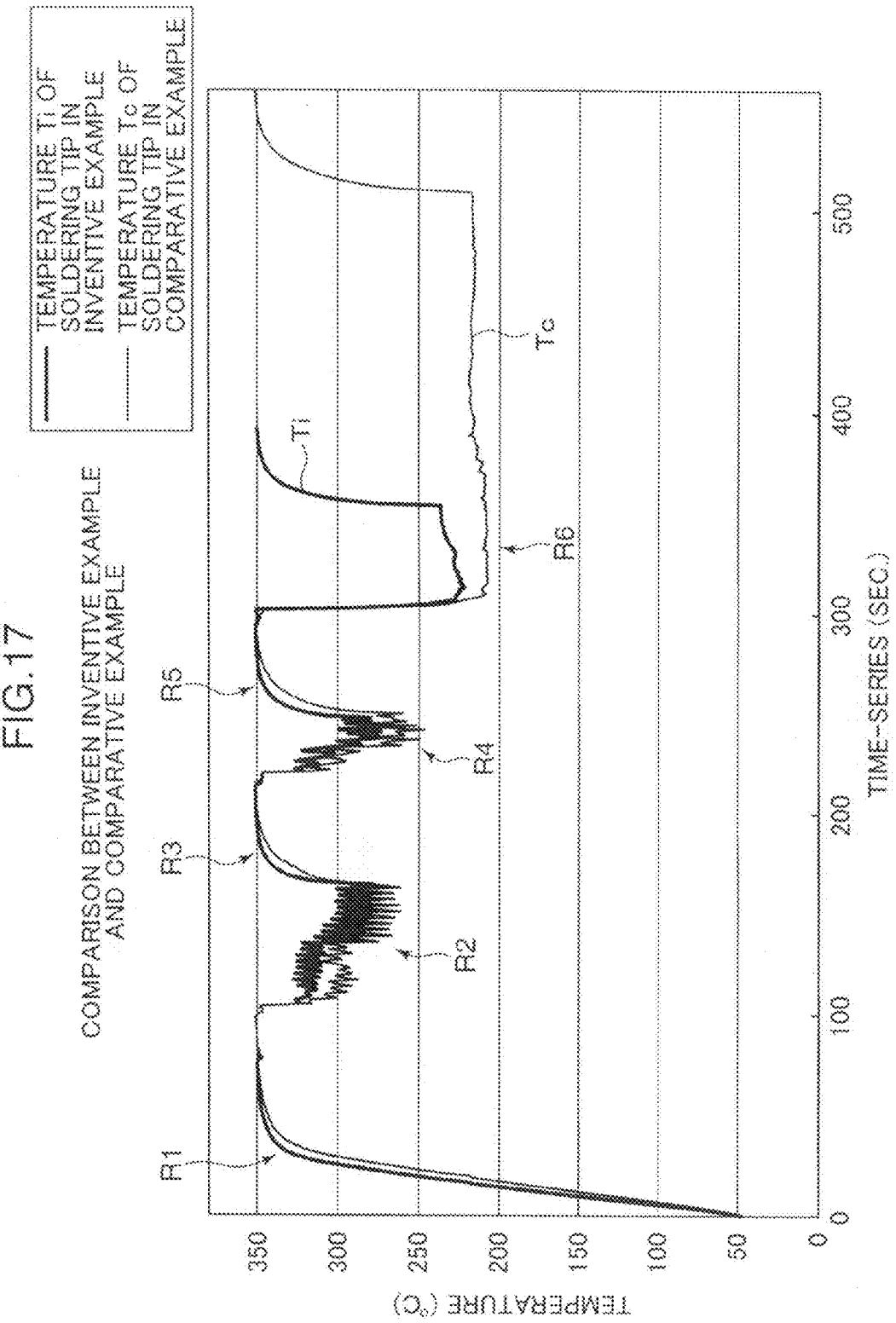
FIG. 17 is a graph for comparing a change in temperature of a iron tip of the inventive example with a change in temperature of a iron tip of the comparative example, in the respective results of the heat-transfer-efficiency comparison tests for the inventive and comparative examples.

After checking that the soldering-tip temperature of the electric soldering iron lowered the given value, the operator tuned on a switch of the recorder 116 to start recording temperature data, based on the setting of the temperature control unit 111a. FIGS. 15 to 17 are based on this record. In FIGS. 15 to 17, each of the lines Ai and Ac designates a detection temperature during the multiple-workpiece test, and each of the lines Bi and Bc designates a detection temperature during the large-workpiece test. Further, each of the lines Ti and Tc designates a soldering-tip temperature. In these lines, the suffix "i" and the suffix "c" designate the inventive example and the comparative example, respectively. In a state after starting the recording of temperature data, the power switch of the electric soldering iron was turned on again to raise the soldering-tip temperature up to 350° C. (characteristic of the region R1 in FIG. 17).

After checking that the soldering-tip temperature reaches 350° C., the operator started the multiple-workpiece test. Firstly, the operator placed the pointed head portion 31 of the heat transfer body 3 on a first one of the soldering-tip contact sections of the first multiple-workpiece test board 113a. In this state, the operator waited until a detection temperature Ac of the test board 113 reaches 250° C. After checking that the detection temperature Ac of the test board 113 reached 250° C., the operator moved the pointed head portion 31 to a second one of the soldering-tip contact sections. The above operations were repeated for all of the ten soldering-tip contact sections of the first multiple-workpiece test board 113a (characteristic of the region R2 in FIG. 17).

After completion of the heat-transfer-efficiency comparison test for the ten soldering-tip contact sections of the first multiple-workpiece test board 113a, the operator successively performed the multiple-workpiece test for the second multiple-workpiece test board 113b in the same manner as that for the first multiple-workpiece test board 113a (characteristic of the region R4 in FIG. 17).

Then, after completion of the multiple-workpiece test for the twenty soldering-tip contact sections of the multiple-workpiece test boards 113a and 113b in total, the operator waited until the soldering-tip temperature is recovered to 350° C. in the no-load state (characteristic of the region R5 in FIG. 17).

After the recovery, the comparison test was shifted to the large-workpiece test. In the large-workpiece test, the pointed head portion 31 of the heat transfer body 3 was placed on the soldering-tip contact portion of the large-workpiece test board 115. The pointed head portion 31 was kept on the soldering-tip contact portion of the large-workpiece test board 115 until the temperature of the large-workpiece test board 115 reached 200° C. When the temperature of the large-workpiece test board 115 reached 200° C., the pointed head portion 31 of the heat transfer body 3 was moved away from the soldering-tip contact portion, and a change in temperature was recorded (characteristic of the region R6 in FIG. 17).

Figure 18:
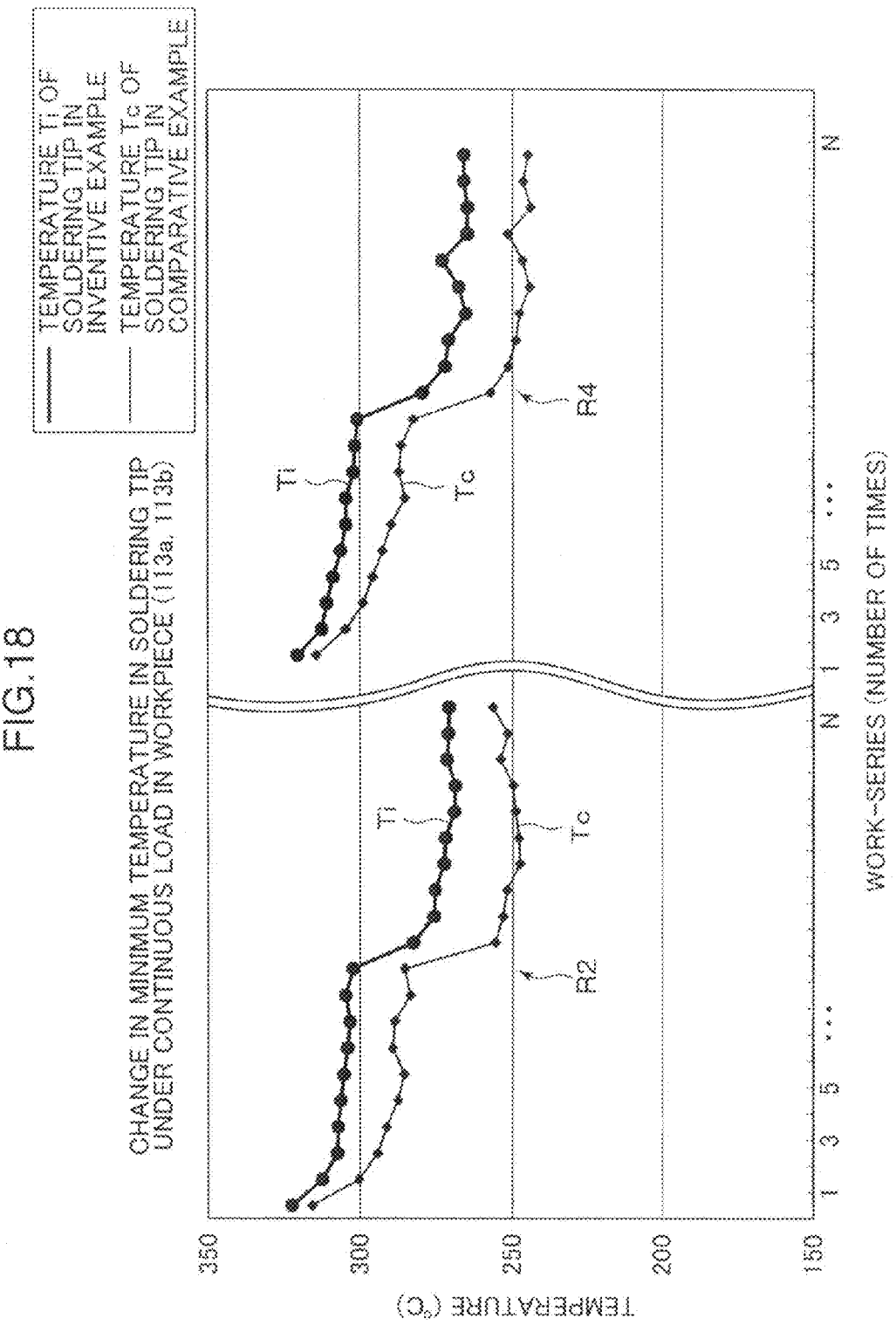
FIG. 18 is a graph for comparing the inventive example with the comparative example, in the region R2 and the region R4 in FIG. 17.

FIG. 18 is a graph for comparing between the inventive example and the comparative example as to the characteristic of the regions R2 and R4 in FIG. 17. In FIG. 18, each of the lines Ti, Tc indicates a soldering-tip temperature, and the suffix "i" and the suffix "c" indicate the inventive example and the comparative example, respectively.

In accordance with the above steps, the "multiple-workpiece" and the "large-workpiece" tests were conducted for each of the inventive example and the comparative example.

(Measurement Result)

Warm-Up Time in Initial Rising

Referring to FIGS. 15 to 17, the inventive and comparative examples are different from each other in a rising speed (increasing rate) of the soldering-tip temperature. Specifically, the rising speed of the soldering-tip temperature in the inventive example is faster than that in the comparative example (see the characteristics of the regions R1, R3, and R5).

Result of Multiple-Workpiece Test

Referring to FIG. 18, comparing between soldering-tip temperatures in the multiple-workpiece test, the soldering-tip temperature Ti of the inventive example was maintained at a value greater than the soldering-tip temperature Tc of the comparative example. In addition, along with an increase in the number of times of the continuous test, a minimum temperature of the comparative example is largely dropped, whereas a minimum temperature of the inventive example is not so largely dropped. Because two heaters having the same energy output were respectively used in the same heat transfer bodies of the inventive and comparative examples, the above result shows that the inventive example using the surface-modified copper pipe has better heat transfer efficiency than that in the comparative example using the stainless-steel pipe. Indeed, a temperature difference (Ti−Tc) at a last measurement point in the region R4 in FIG. 18 rises up to +21° C.

Result of Large-Workpiece Test

With respect to the result on the large-workpiece test board 115 indicated by the characteristic of the region R6 in FIG. 17, when the pointed head portion 31 of the heat transfer body 3 was placed on the large-workpiece test board 115, the soldering-tip temperature Tc of the comparative example dropped from 350° C. to 208.7° C. (see FIG. 15). FIG. 15 also shows that the soldering-tip temperature Tc did not rise for a while even after the timing when the soldering-tip temperature Tc was dropped to 208.7° C. It means that the heat was gradually conducted, taking about 200 seconds, from the heating member to the heat transfer body 3 and then from the pointed head portion 31 of the heat transfer body 3 to the large-workpiece test board 115. After the elapse of about 200 seconds, the operator finally checked that the temperature of the large-workpiece test board 115 reached 200° C., and moved the heat transfer body of the electric soldering iron away from the large-workpiece test board 115. Then, the soldering-tip temperature Tc increased sharply.

Differently, in the inventive example, when the pointed head portion 31 of the heat transfer body 3 was placed on the large-workpiece test board 115, there was only a small drop in the soldering-tip temperature Ti from 350° C. to 221.6° C. In the inventive example, the soldering-tip temperature Ti was rapidly changed to a recovery tendency after about 40 seconds from the timing when the soldering-tip temperature Ti was lowered to 221.6° C. After the elapse of about 40 seconds, the operator thus checked that the temperature of the large-workpiece test board 115 reached 200° C., and moved the heat transfer body of the electric soldering iron away from the large-workpiece test board 115. Then, the soldering-tip temperature Ti was sharply raised.

Based on the above test results, it could be verified that, even though the tests were conducted using the same heat transfer bodies 3 and the heaters having the same heating value represented by power consumption of the heater, a large difference occurred between the inventive and comparative examples in the recovery of the soldering-tip temperature after heating of the large-workpiece test board. This would be considered as a result that the surface-modified copper pipe used in the inventive example allowed a heat transfer from the heating member to the heat transfer body to be efficiently performed, as compared with a conventional electric soldering iron using the stainless-steel pipe as in the comparative example.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A heat transferring member for a solder handling device, the heat transferring member comprising:
   a heat transfer body having a cavity formed therein;
   a pipe disposed in the cavity, the pipe including a tubular-shaped substrate of copper or copper alloy, the pipe further including an aluminum oxide film over the substrate.

2. The heat transferring member of claim 1, wherein the pipe includes a copper-aluminum alloy layer on the substrate or as part of the substrate, and the aluminum oxide film is formed on a surface of the copper-aluminum alloy layer.

3. The heat transferring member of claim 1, wherein the aluminum oxide film is formed on the substrate by a chemical reaction with oxygen.

4. The heat transferring member of claim 1, wherein the aluminum oxide film is formed on the substrate by a chemical reaction with oxygen following a process selected from the group consisting of a process in which aluminum is diffused into the substrate, a process in which a mixture of aluminum powder particles and a flux material is applied to the substrate and heated to a temperature that melts the aluminum powder particles on the surface of the substrate, and a process in which the substrate is immersed in molten aluminum.

5. The heat transferring member of claim 1, wherein the pipe includes an inwardly-extending flange that is adjacent to a dead-end of the cavity.

6. The heat transferring member of claim 1, wherein the pipe includes a proximal end segment, a distal end segment adjacent a dead-end of the cavity, and an intermediate segment between the proximal and distal end segments, wherein the substrate of the pipe at the proximal end segment is contained in the cavity and has a polygonal shape in transverse cross-section, and wherein a diameter of a circumscribed circle about the polygonal shape is greater than an outer diameter of the substrate at the intermediate segment and an inner diameter of the cavity.

7. The heat transferring member of claim 1, wherein the pipe includes a proximal end segment and a distal end segment adjacent a dead-end of the cavity, and the substrate of the pipe at the proximal end segment has a flared shape.

8. The heat transferring member of claim 1, wherein the heat transfer body includes a core portion of copper or copper alloy.

9. The heat transferring member of claim 1, wherein the heat transfer body includes a sleeve portion and a tip portion, the sleeve portion containing at least a portion of the pipe, the tip portion including tapered point or a hollow nozzle.

10. The heat transferring member of claim 1, wherein the pipe has a cavity configured to receive a heater, and the pipe has an area of sufficient size that allows thermal energy from the heater to be conducted through the pipe and into the heat transfer body so that at least a portion of the heat transfer body reaches at least 300° C.

11. A solder handling device comprising:
    a heat transfer body including a sleeve portion and a tip portion configured to melt solder, the tip portion including a tapered point or a hollow nozzle;
    a pipe disposed in the sleeve portion, the pipe including a tubular-shaped substrate of copper or copper alloy, the pipe further including an aluminum oxide film over the substrate; and
    an electric heater disposed in the pipe.

12. The device of claim 11, wherein the pipe includes a copper-aluminum alloy layer over the substrate, and the aluminum oxide film is disposed on the copper-aluminum alloy layer.

13. The device of claim 11, wherein the aluminum oxide film is disposed over at least an outer surface of the pipe.

14. The device of claim 11, wherein the heat transfer body includes a core of copper or copper alloy and a covering over the core, the covering including at least one of an iron plating and a chromium plating.

15. The device of claim 11, wherein the sleeve portion is configured to receive and frictionally engage the pipe.

16. The device of claim 11, wherein the pipe is configured to slideably receive the heater.

17. The device of claim 11, wherein inner and outer surfaces of the pipe each have an area of sufficient size that allows thermal energy from the heater to be conducted through the pipe and into the heat transfer body so that the tip portion reaches at least 300° C.

18. A method of making a heat transferring member for a solder handling device, the method comprising:
    providing a heat transfer body including a sleeve portion;
    placing a pipe in the sleeve portion, the pipe including a substrate and an aluminum oxide film over the substrate, the substrate made of copper or copper alloy.

19. The method of claim 18, further comprising forming the aluminum oxide film over the substrate by subjecting the substrate to a process before the placing of the pipe in the sleeve portion, the process selected from the group consisting of a pack cementation process, a slurry coating process, and a process of immersion into molten aluminum.

20. The method of claim 18, further comprising forming a copper-aluminum alloy layer at a surface of the substrate, the forming performed before the placing of the pipe in the sleeve portion.

21. The heat transferring member of claim 1, wherein the pipe is clamped by the heat transfer body.

22. The heat transferring member of claim 1, wherein there is no aluminum oxide passivation film on an interior surface of the cavity.

23. The heat transferring member of claim 1, wherein the aluminum oxide film is disposed on at least an outer surface of the pipe.

24. The heat transferring member of claim 23, wherein the aluminum oxide film is disposed on an inner surface of the pipe.

25. The device of claim 11, wherein the pipe is clamped by the sleeve portion.

26. The device of claim 11, wherein there is no aluminum oxide passivation film on an interior surface of the sleeve portion.

* * * * *

UNITED STATES PATENT AND TRADEMARK OFFICE
Certificate

Patent No. 8,309,877 B2                                                      Patented: November 13, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Yoshitomo Teraoka, Sennan (JP); Takashi Nagase, Kashiba (JP); Susumu Yamashita, Togitsu-chou (JP); and Yusaku Amatani, Togitsu-chou (JP).

Signed and Sealed this Thirty-first Day of December 2013.

*JULIO J. MALDONADO*
*Supervisory Patent Examiner*
*Art Unit 2898*
*Technology Center 2800*